US006991939B2

(12) United States Patent
Walt et al.

(10) Patent No.: US 6,991,939 B2
(45) Date of Patent: Jan. 31, 2006

(54) OPTICAL ARRAY DEVICE AND METHODS OF USE THEREOF FOR SCREENING, ANALYSIS AND MANIPULATION OF PARTICLES

(75) Inventors: David R. Walt, Medford, MA (US); Irving L. Weissman, Redwood City, CA (US); Israel Biran, Roosh Haain (IL); Jenny Tam, Arlington, MA (US)

(73) Assignee: Tufts University, Medford, MA (US)

( * ) Notice: Subject to any disclaimer, the term of this patent is extended or adjusted under 35 U.S.C. 154(b) by 578 days.

(21) Appl. No.: 10/199,341

(22) Filed: Jul. 19, 2002

(65) Prior Publication Data

US 2003/0032204 A1 Feb. 13, 2003

Related U.S. Application Data

(60) Provisional application No. 60/306,664, filed on Jul. 19, 2001.

(51) Int. Cl.
*G01N 21/64* (2006.01)

(52) U.S. Cl. ...................... 436/172; 436/177; 436/537; 422/82.07; 422/99; 250/251; 250/458.1

(58) Field of Classification Search ................ 250/251, 250/458.1, 459.1; 436/518, 536, 537, 164, 436/165, 172, 174, 180; 422/82.05, 82.08, 422/99, 100

See application file for complete search history.

(56) References Cited

U.S. PATENT DOCUMENTS

| | | | | |
|---|---|---|---|---|
| 4,799,756 | A * | 1/1989 | Hirschfeld | 385/15 |
| 4,893,886 | A | 1/1990 | Ashkin et al. | |
| 5,109,447 | A * | 4/1992 | Chan | 385/45 |
| 5,254,477 | A | 10/1993 | Walt | |
| 5,294,790 | A * | 3/1994 | Ohta et al. | 250/216 |
| 5,320,814 | A | 6/1994 | Walt et al. | |
| 5,912,181 | A | 6/1999 | Petcavich | |
| 6,023,540 | A | 2/2000 | Walt et al. | |
| 6,055,106 | A | 4/2000 | Grier et al. | |
| 6,180,415 | B1 * | 1/2001 | Schultz et al. | 436/518 |
| 6,200,737 | B1 | 3/2001 | Walt et al. | |
| 6,210,910 | B1 | 4/2001 | Walt et al. | |
| 6,287,765 | B1 * | 9/2001 | Cubicciotti | 435/6 |
| 6,287,871 | B1 | 9/2001 | Herron et al. | |
| 6,370,406 | B1 * | 4/2002 | Wach et al. | 600/310 |
| 6,375,903 | B1 | 4/2002 | Cerrina et al. | |
| 6,416,190 | B1 | 7/2002 | Grier et al. | |
| 6,734,436 | B2 * | 5/2004 | Faris et al. | 250/432 R |

OTHER PUBLICATIONS

Ashkin, (1991), *ASGSB Bull.*, 4(2):133-46.
Taguchi et al., (2000), *Jpn. J. Appl. Phys.*, 39:L1302-L1304.
Taguchi et al., (2000), *IEICE Trans. Electron*, E83-C.

(Continued)

*Primary Examiner*—Jeffrey R. Snay
(74) *Attorney, Agent, or Firm*—Pamela J. Sherwood; Bozicevic, Field & Francis LLP

(57) ABSTRACT

Methods and devices are provided for the trapping, including optical trapping; analysis; and selective manipulation of particles on an optical array. A multi-channel device parcels a light source into many points of light transmitted through an optical array of fibers or conduits, preferably where the individual points of light are individually controllable through a light controlling device. Optical properties of the particles may be determined by interrogation with light focused through the optical array. The particles may be manipulated by immobilizing or releasing specific particles, separating types of particles, etc.

31 Claims, 15 Drawing Sheets

OTHER PUBLICATIONS

Lyons and Sonek, (1995), *Appl. Phys. Lett.*, 66:1584-6.
Sasaki et al., (1991), *Jpn. J. Appl. Phys.*, 30:L907-L909.
Sasaki et al., (1991), *Opt. Lett.*, 16:1463-5.
Mio et al., (2000), *Rev. Sci. Instrum.*, 71:2196-2200.
Dufresne et al., (1998), *Rev. Sci. Instrum.*, 69:1974-1977.
Dufresne et al., (2001), *Rev. Sci. Instrum.*, 72:1810-1816.
Ogura et al. (2001), *Appl. Opt.*, 40:5430-35.
Mogenson and Gluckstad, (2000), *Opt. Commun.*, 175:75-81.

* cited by examiner

A

B

C

Hole to insert imaging fiber

OPTICAL ARRAY DEVICE AND METHODS OF USE THEREOF FOR SCREENING, ANALYSIS AND MANIPULATION OF PARTICLES

BACKGROUND

Optical tweezer systems use a laser beam brought into tight focus to change the gradient forces surrounding dielectric particles, where the radiation pressure traps particles. In early experiments, optical gradient forces were created from a single beam of light used to control and manipulate micrometer-sized particles. For example, a single-mode, $TEM_{00}$ laser beam was brought to a tight focus at or near the sample's focal plane. By providing a focal region of light into a cell, a laser-based light source was able to provide enough radiation pressure to trap a particle immersed in a fluid medium entering the focal region.

For optical trapping, the diameter of the laser beam should closely or exactly fill, or somewhat overfill, the back pupil of an objective lens. By filling the back aperture of the objective lens, the light converges to a tight, diffraction-limited spot. The photons from the laser spot absorb, scatter, or refract a dielectric sphere with an index of refraction higher than the surrounding medium. The photons' momentum changes, and by Newton's Second law, the rate of change of the deflected rays' momentum results in an equal and opposite rate of change in the particle's momentum. Thus, the force impacted from photons is proportional to the spatial gradient of the light intensity, and a trapped particle acts in the direction of that light.

It has been suggested that optical trapping, or tweezer systems could be applied to biological microparticles, for example see U.S. Pat. No. 6,416,190. Cell separation and phenotypic analysis are a rapidly growing area of biomedical and clinical development. Improved methods of separating a desired cell subset from a complex population permit the study and use of cells that have relatively uniform and defined characteristics. Cell separation is widely used in research, e.g. to determine the effect of a drug or treatment on a targeted cell population; investigation of biological pathways; isolation of transformed or otherwise modified cell populations; etc. One widely used method for cell analysis and separation is flow cytometry, where the cells can be detected by fluorescence or light scattering. However, there are significant disadvantages to the use of flow cytometry. Although a high degree of purity can be achieved, cells are processed in series, i.e. single file through the sorter. Even with high flow rates, it is time-consuming to isolate a sufficient number of cells for clinical applications, since several sorting cycles are required.

Conventional optical tweezer systems use a single laser beam to create a single trap, manipulating a particle at a time. But in order to trap and manipulate multiple particles, multiple beams of light must be used. Current optical tweezer techniques and methodology are not readily extended to create multiple beams, thereby limiting the throughput and potential use in many applications. The present invention provides a novel approach and methodology to create high-density arrays of optical traps.

Relevant Literature

U.S. Pat. No. 6,210,910 describes an optical fiber biosensor array comprising cell populations confined to microcavities. U.S. Pat. No. 6,200,737 is directed to photodeposition methods for fabricating a three-dimensional patterned polymer microstructure on solid substrates using unitary fiber optic arrays for light delivery. U.S. Pat. No. 6,023,540 provides a fiber optic sensor with encoded microspheres. U.S. Pat. No. 5,320,814 describes fiber optic array sensors, apparatus, and methods for concurrently visualizing and chemically detecting multiple analytes of interest in a fluid sample. Fluorescence intramolecular energy transfer conjugate compositions and detection methods are disclosed in U.S. Pat. No. 5,254,477.

Optical trapping is described, e.g. in U.S. Pat. No. 4,893,886, as a single-beam gradient force trap. This force trap consists of a strongly focused light beam which has a near Gaussian transverse intensity profile. The stabilizing effect on the trapped particle arises due to the combination of the radiation pressure scattering and gradient force components, which combine to give a locus of stable equilibrium near the focus of the laser beam. Thus, stabilizing the trapped particle occurs by strongly focusing the light. The majority of currently produced optical tweezer systems create a single or a few tweezers, moving a singular or a few particles at a time. Dual beams of light have been used as optical tweezers to manipulate microscopic objects and cells. Both single and dual-beam traps were used to levitate a microsphere from the bottom of a sample chamber (Ashkin (1991) ASGSB Bull. 4(2):133–46).

Taguchi et. al. (2000) *Jpn. J. Appl. Phys.* 39:L1302–L1304; and Taguchi et al. (2000) *IEICE Trans. Electron.* E83-C used single mode optical fibers to trap and manipulate microspheres and cells. Cells were also trapped using a single laser beam from an optical fiber inserted at an angle in a sample chamber. Manipulation of the cell was achieved by using a dual optical fiber arrangement. Lyons and Sonek (1995) *Appl. Phys. Lett.* 66:1584–6 used a dual single mode fiber optical trap with tapered ends coupled to laser diodes to trap dielectric particles. Axial and transverse trapping was exhibited. Sasaki et al. (1991) *Jpn. J. Appl. Phys.,* 30:L907–L909; and Sasaki et al. (1991) *Opt. Lett.* 16:1463–5 reported on a repetitive laser scanning method to manipulate and pattern multiple microparticles in solution. The particles were aligned by continuously scanning at 13 to 50 Hz by computer controlled galvano mirrors. Mio et al. (2000) *Rev. Sci. Instrum* 71:2196–2200 have reported a laser-scanning method to manipulate colloids and biological cells in solution. A single beam scanned at rates as high as 1200 Hz to trap multiple colloids simultaneously. In all the methods mentioned above, one trap was used.

Methods have been proposed for creating an array of traps. Dufresne et al. (1998); *Rev. Sci. Instrum.* 69:1974–1977; Dufresne et al. (2001) *Rev. Sci. Instrum.* 72:1810–1816; U.S. Pat. No. 6,055,106; and U.S. Pat. No. 6,416,190 disclose techniques for creating multiple optical tweezers using commercially available diffraction gratings as well as computer-generated holograms. The diffractive optical elements generate triangular and square tweezer arrays with up to 400 individual traps.

Ogura et al. (2001) *Appl. Opt.* 40:5430–35 propose a method for a trap array using multiple beams generated by a vertical-cavity surface emitting (VCSEL) array. Multiple particles were simultaneously captured and manipulated by using an 8×8 VCSEL-based tweezer array. Mogensen and Gluckstad (2000) *Opt. Commun.* 175:75–81 report a method of creating an optical tweezer array, by using a phase-only liquid crystal spatial light modulator (SLM) to encode an image directly in the phase component of a laser beam. This general phase contrast approach creates a low loss system to simultaneously manipulate multiple microparticles.

SUMMARY OF THE INVENTION

Methods and devices are provided for the trapping and selective manipulation of particles, including small dielectric particles; cells and other biological particles; etc. on an optical array. A multi-channel device parcels a light source into each of the individual elements in an optical array of fibers or conduits, preferably where individual beams of light are separately controlled. In one embodiment of the invention, each element in the optical array focuses the light, producing an array of focused light beams, each capable for optical trapping. The particles of interest are brought into proximity with the terminus of the array. The optical properties of the examined particles, e.g. the presence of fluorescent moieties, may be determined by interrogation, for example with light focused through the optical array; from underneath the particles flowing plane by using an inverted microscope setup, etc., where a plurality of particles may be interrogated in parallel. The particles can be manipulated by optical trapping; immobilizing or releasing specific particles, separating types of particles, etc. Manipulation methods advantageously utilize information about optical properties to select the targeted particles.

In one embodiment of the invention, laser light is coupled into the optical array to create an array of optical traps, or tweezers, providing a simple, straightforward technique to trap and manipulate a multitude of microparticles in a parallel fashion. The tweezer array is used to simultaneously capture, assemble, move, sort or direct multiple materials, cells or particles into desired spatial patterns for a variety of uses. This method is advantageous in that a large number of traps are created within a small area, and each trap is easily addressable, providing a method to selectively trap particular particles while simultaneously releasing unwanted ones. This method creates different spatial patterns of trapped particles or cells, providing tools for designing new types of assays such as examining interactions between different cell types, protein-protein interactions, and immunoassays.

In an alternative embodiment, particles are retained on the optical array terminus through chemical or spatial features, e.g. by forming microwells on the terminus. The release or retention of targeted particles, particularly cells, is provided through a photoactivation step, particularly where information about the optical properties is used to selectively photoactivate targeted particles. The photoactivation step may alter the viability or binding properties of a subset of a cell population. Preferred photoactivation steps include photoablation of undesirable cells; photoactivation of toxins; photoactivation of cross-linking agents that bind cells or particles to the optical array; photocleavage of linkers binding cells to the optical fibers; and the like. Further separation steps may include washing away of unbound cells, which can be discarded, or collected for further processing.

In one embodiment of the invention, a device is provided that is suitable for optical trapping or photoactivation sorting of particles. The devices of the invention comprise an optical array comprising a plurality of strands, i.e. optical fibers or conduits, wherein each strand of the array is capable of holding at or near its terminus a single cell or particle. The optical array may be contained within a sealed apparatus suitable for processing of cells for clinical purposes. Devices may also include fluidic systems, which may comprise pumping means, fluidic channels, vessels for input and output, etc.; light systems, e.g. a laser light source, devices for controlling light, e.g. micromirror device; and data detection and control systems, e.g. a light detecting system, a data processor.

DETAILED DESCRIPTION OF THE EMBODIMENTS

Figure 1A:
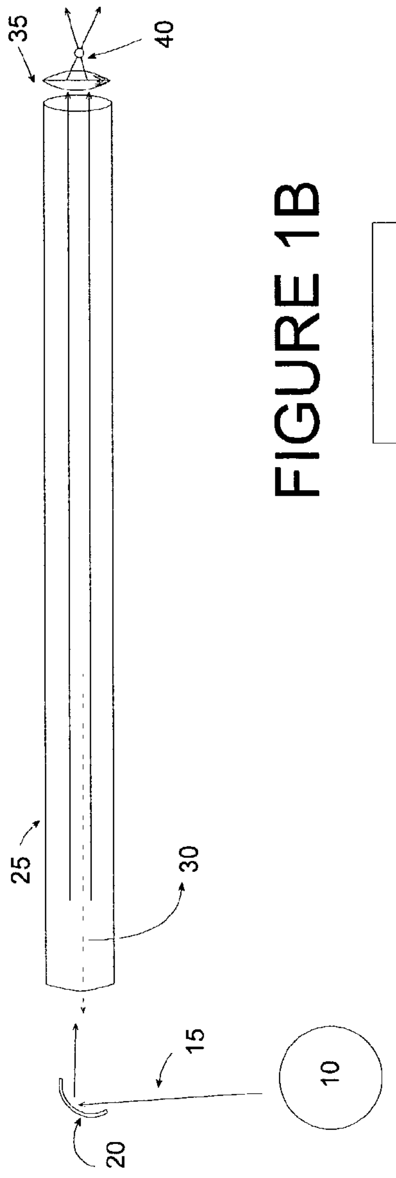
FIGS. 1A, 1B and 1C: Schematics for an optical tweezer array.

Devices are provided that are useful in the manipulation of populations of particles based on their optical properties. An optical array comprising multiple strands of optical fibers or conduits is operably connected to an optical detector and a light source, usually where a single light source is passed through a multi-channel device that parcels the beam into multiple points of light. Particles of interest are retained on or near the fiber or conduit terminus, e.g. through optical trapping. The particles are individually interrogated for optical properties, and can be selectively manipulated by optical trapping, and/or by photoactivation processes.

The optical array provides a substrate for the display of a population of particles, where the particles are distributed over the termini and dispersed, where (a) a single particle may be trapped on a single strand of the array, (b) two or more, usually not more than about 5 or more particles are trapped on a single strand of the array, or (c) a single particle may be trapped by two or more light beams. The particles may be distributed by flowing over the face of the optical array, resulting in terminally bound individual particles, e.g. by settling into wells provided at the terminus of the fiber array; by binding to capture moieties on the face of the array, or held at some distance from the fiber face by optical trapping; and the like.

By using an optical fiber or conduit as a waveguide to transmit light between the particle and a sensor, or by interrogating the particles by sensors located underneath the particles flowing plane, information can be obtained about the specific optical properties of each particle, which optical properties correlate with various characteristics of the particle, e.g. the presence of fluorescent tags in combinatorial libraries, on the surface of cells, etc. The optical properties may be inherent to the particle, e.g. autofluorescence; or may be the result of specific labeling schemes. This optical information can be collected, and optionally is used to determine the targeting of particles for manipulation, e.g. retention, translocation, ablation, release, and the like. The trapped particles can also be viewed by through a separate system optical system, e.g. an inverted microscope, and the like.

Photoactivation Trapping

In one embodiment, cells are retained on the terminus of elements in the optical array through chemical or spatial features. The release or retention of targeted cells is provided through a photoactivation step, particularly where information about the optical properties is used to selectively photoactivate targeted cells. The photoactivation step alters the viability or binding properties of a subset of the cell population. Preferred photoactivation steps include photoablation of undesirable cells; photoactivation of toxins; photoactivation of cross-linking agents that bind cells to the optical fibers; photocleavage of linkers binding cells to the optical fibers; and the like. Further separation steps may include washing away of unbound cells, which can be discarded, or collected for further processing.

Optical Trapping

In one embodiment of the invention, optical trapping is used to retain particles. An optical array parcels a light source through individual elements of the array, which elements focus a light beam to produce an optical trapping beam at the terminus. Preferably individual beams of light are separately controllable. Such an array, referred to herein as an optical tweezer array, may be formed by coupling a laser beam into an optical array, usually where elements in the array have a numerical aperture greater than one (FIG. 1A). The numerical aperture (NA) of a lens is the half angle of the cone of light accepted by the lens, i.e., it determines how much light a lens will accept. Where the numerical aperture is greater than one, the array can achieve three dimensional trapping, suspending a particle in suspension. For numerical apertures less than 1, the array can achieve two dimensional trapping, where particles are suspended against a barrier, e.g. the bottom of a sample chamber, cover slip, etc.

Suitable optical arrays comprise a bundle of individual fibers or conduits for transmission of light, and a means of focusing the light at the terminus. Each fiber or conduit transmits a focused beam of light, which light provides sufficient radiation fields and forces to trap a particle in the focal region. In creating an array of traps, each individual fiber in the imaging fiber bundle serves as a lens, focusing incoming light to a confined trap. When laser light is coupled into the imaging bundle, the laser is split into a multitude of beams, usually where each beam corresponds to one fiber in the array. The focused beam of light provides radiation fields and forces for optical trapping. Particles in proximity to the terminus of the fibers are retained while the radiation fields and forces is maintained, and can be selectively released by dropping the radiation fields and forces. This method can also be used for transferring the particles from one location to another, as well as suspending a particle for measurement. Optical traps are useful for confining, isolating, translating and manipulating one or a selected group of particles in a population. The optical tweezer array may be observed by using a standard inverted microscope arrangement.

A device that controls the transmission of laser light through each individual fiber or conduit in the optical array is preferably used, such that an individual trap in the tweezer array can be selectively turned off or on. This capability allows parallel manipulation of individual objects in the array. As a result, the array can trap or release any selected object, spatially move objects to different traps in the array, rotate objects at a controlled speed, and assemble different micro- and nanostructures.

A single trapping beam may be used to trap a particle, or multiple beams. A strand of a given diameter can generate a trapping beam sufficient to trap a single particle, or several particles of smaller diameter. Particles having a diameter larger than the diameter of the strand may be trapped with multiple beams, or may be trapped with a single beam, where there may be some steric hindrance between adjacent particles. The use of multiple beams also provides the ability to rotate individual particles to a preferred orientation, and a particle can be moved by turning on and off successive fibers in the bundle.

An array of particles trapped by the tweezer array can be simultaneously interrogated using different wavelengths. For example, cells that produce fluorescent signals, e.g. expressing GFP, comprising labeled antibodies bound to cell surface markers, etc., can be trapped with infrared or near infrared laser light, while light at visible wavelengths can be used for excitation and emission measurements. Cells that produce high fluorescence signals can be identified, and they can then be sorted by turning off traps containing low fluorescence cells, thereby releasing them. At the same time, traps corresponding to the desired cells remain on, holding the cells stationary while the unwanted cells flow away. Alternatively, traps that contain the desired cells can be turned off, allowing the desired cells to flow and be collected for analysis while the undesired cells remain trapped. Using such an approach provides a parallel sorting technique of a multitude of microparticles.

By providing a method to create an optical tweezer array where each trap can be controlled, applications such as sorting and screening microscopic objects can be dramatically improved. Although current flow cytometry technologies provide high screening and sorting speeds, they are based on interrogating a single object or cell at a time. The tweezer array provides a parallel screening process, with much higher screening and sorting speeds. The tweezer array can be used to sort any given object or cell population to an unlimited number of groups because the cells are held and can be interrogated by multiple excitation/emission wavelengths over long periods of time (seconds to hours), unlike currently used technologies such as FACS (fluorescence activated cell sorter) which are limited in the number of wavelengths, as the particles must be interrogated while they transit through the laser beam. The tweezer array provides a means to monitor responses from many individual trapped cells or objects over time, providing new information about the kinetics of complex cellular or biochemical processes that cannot be obtained using current technologies. The tweezer array can also have the ability to selectively ablate trapped cells by appropriately altering the wavelength of the laser.

In addition to sorting and screening applications, a tweezer array can be used for clinical diagnostics applications, e.g. blood cell diagnostics; detection of cancer cells and ablation, or separation from normal cells; bone marrow transplantation applications; personalized or tailored cancer treatment; monitoring AIDS patients; monitoring organ transplant patients for rejection; isolating fetal cells from the mother's circulating blood; identifying infectious bacteria in blood or urine and determination of therapeutically effective antibiotics, and the like.

Additional tweezer array applications include chemical and biological sensor arrays where sensing particles or cells are held while solutions flow past the arrays. Such arrays can be used for various sensing applications, including screening drugs (drug discovery), testing clinical or environmental samples, etc. Particles may comprise a reactive or binding moiety, e.g. nucleic acids; antibodies; metal binding moieties; carbohydrate groups; polypeptides, e.g. receptors, ligands, etc.

Other uses include stem cell technologies, manipulation of biological materials, manipulation of nanoparticles, assembling of nano- and microparticles, and fabrication of micro- and nanostructures. Another application area is in combinatorial chemistry and biology. In this approach, combinatorial bead or cell libraries are prepared and then trapped in the tweezer array. Test solutions containing, for example, fluorescently-labeled biological receptors are passed over the trapped beads or cells. Particles that bind the receptor would signify binding by increasing their fluorescence intensity. Such beads could be held and all other beads released or vice versa.

Optical Array and Device

An optical array of the present invention comprises multiple strands, or a multiple strand, of individual optical fibers or conduits for transmission of light. Optical arrays, of interest may comprise, without limitation, bundles of optical fibers, bundles,of optical conduits such as capillary tubes filled with liquids including aqueous solutions, supported lipid bilayers, plastic, air, etc., and the like. For example, see Janshoff and Kunneke (2000) Eur Biophys J29(7):549–54.

Usually a plurality of optical fibers or conduits are arranged coaxially along their lengths to form a single, discrete construction. Each individual strand comprises a single optical fiber or capillary having a rod-like shaft and two ends, designated a sensor end and a transmission end. The strand is able to transmit light energy introduced at either of its ends, e.g. glass, plastic, etc. Optical fibers, for example, are conventionally known and commercially available as step-index or graded-index fibers. Suitable fiber arrays are described in U.S. Pat. No. 6,210,910, herein incorporated by reference. Where the bundle comprises optical fibers, the fiber may be a step-index fiber or a graded-index fiber, e.g. a graded-index fiber having a parabolic refractive index profile that results in continual refocusing of the rays in the core, and compensates for multimode distortion.

Generally each optical fiber or conduit of the invention will have a cross sectional diameter of at least about 0.5 $\mu$m, usually at least about 1 $\mu$m, more usually at least about 5 $\mu$m, and not more than about 500 $\mu$m in diameter, more usually not more than about 250 $\mu$m in diameter. The length of the fiber may vary, but preferably will range from about 5 mm to not more than about ten meters. The optical fiber may be polygonal or asymmetrically shaped along its length, and can provide special patterns and shapes at the termini.

In one embodiment, the distal terminus of strands in a fiber optic array are chemically etched so as to create a cavity or microwell, as described in U.S. Pat. No. 6,210,910, herein incorporated by reference. The microwells are formed by anisotropic etching of the cores of the individual fibers in the fiber array. The etching process is controlled so as to remove a centralized core portion of the individual fiber strands while leaving the surrounding cladding substantially intact, e.g. through differential rates of etching at the core and the cladding. The resultant etched cavity may be dimensioned for accommodating an individual cell or microlens. By selecting a fiber optic array whose individual fiber cores are appropriately sized and by careful control of the etching conditions, the diameter and depth of the microwells can be controlled and adjusted over any convenient dimension range so as to match the size of any desired cell type. The array design can accommodate a variety of particle sizes and configurations utilizing either commercially available optical fibers and fiber optic arrays or custom made fibers or fiber arrays.

In one embodiment, the interior surfaces of the microwells may be coated with a thin film of material such as collagen, fibronectin, polylysine, polyethylene glycol, polystyrene, or a metal such as gold, platinum or palladium. In an alternative embodiment, a capture moiety, e.g. an antibody or other binding agent is attached to the microwell surface for selective binding of the cells of interest. Wells may also be provided with photoactivatable agents, e.g. pro-toxins, pro-linkers, etc. that are selectively activated during the photoactivation step. Alternatively, a binding member can be bound to the optical fiber through a photolabile linker, where cells can be bound to the optical fiber through the binding member, then released through a photocleavage step.

A large variety of methods are known for attaching biological molecules to solid supports. See generally, Methods in Enzymology, Vol. 34, ed. W. B. Jakoby, M. Wilchek, Acad. Press, N.Y. (1974) and Immobilized Biochemicals and Affinity Chromatography, Advances in Experimental Medicine and Biology, vol. 42, ed. R. Dunlap, Plenum Press, N.Y. (1974), which are incorporated herein by reference. For example, U.S. Pat. No. 4,681,870 describes a method for introducing free amino or carboxyl groups onto a silica matrix. These groups may subsequently be covalently linked to, e.g., a protein or other binding member, in the presence of a carbodiimide. Alternatively, a silica matrix may be activated by treatment with a cyanogen halide under alkaline conditions. Another example is presented in U.S. Pat. No. 4,282,287, which describes a method for modifying a polymer surface through the successive application of multiple layers of biotin, avidin and extenders. Also, U.S. Pat. No. 4,762,881 describes a method for attaching a polypeptide chain to a solid substrate by incorporating a light-sensitive unnatural amino acid group into the polypeptide chain and exposing the product to low-energy ultraviolet light.

Where the optical array provides for optical trapping, it is desirable to provide a light focusing element, such that a light beam transmitted through the fiber will be focused and can provide sufficient radiation fields and forces to optically trap a cell. Laser diodes alone produce a beam that is divergent and astigmatic. In case of a laser diode assembly using multiple emitters, the small dimension of the emitters causes a very large divergence of the beam emitted therefrom. There exist different kinds of optics for collimating a laser diode bar or array. Examples of such optics are ordinary cylindrical fiber lenses, ball lenses, aspherical fiber lenses, photothermally generated lens arrays and holographic or binary diffractive optics.

One example of a self-focusing element is a graded-index fiber, usually having fiber core diameters of about 50 to about 65 $\mu$m, with a parabolic refractive index profile that results in continual refocusing of the rays in the core. See, for example, U.S. Pat. No. 5,825,803; and Teiji (1970) *IEEE J. Quantum Electron.* 6:606–12. Alternatively, chemically altering the face of each fiber in the bundle can be used to provide an array of lens-like focusing elements, e.g. photo-deposited micrometer-scale polymers (Healey, et. al. (1995)), or polymeric microlens arrays (Hartmann et al. (2001)).

Figure 2:
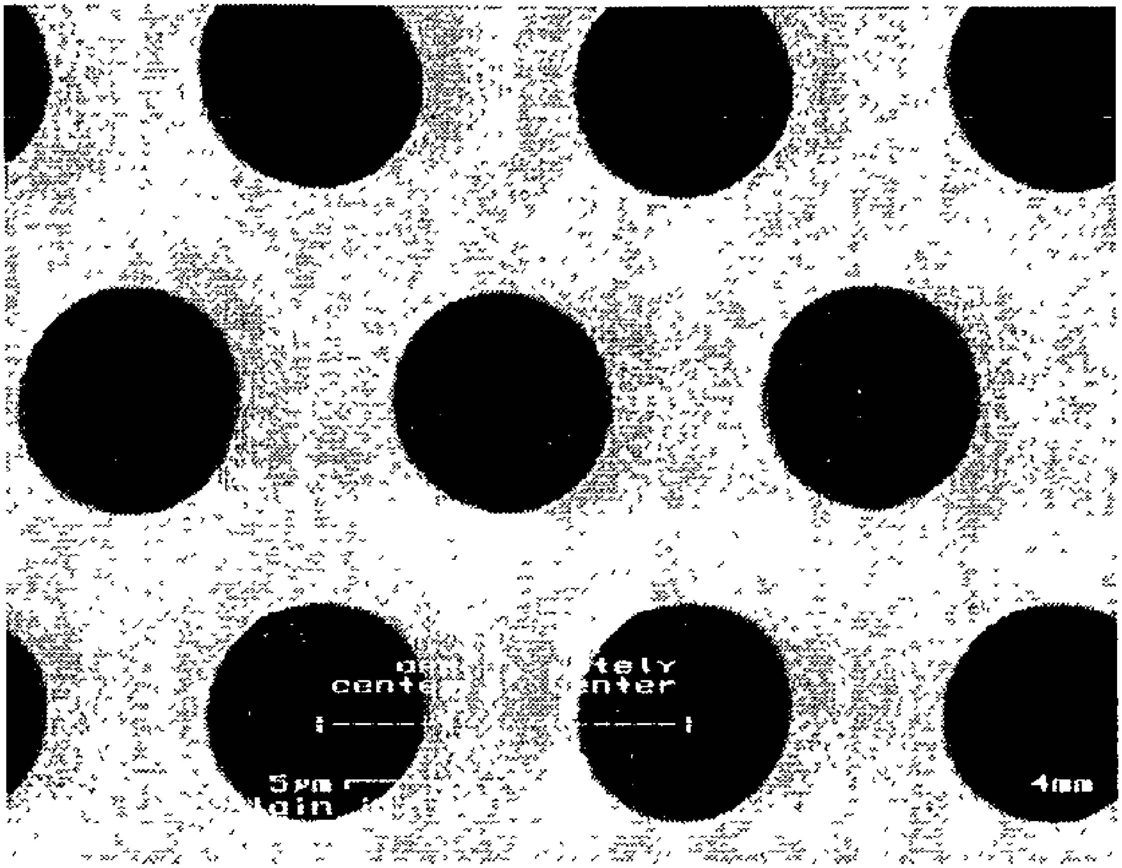
FIG. 2: FE-SEM image of etched fiber optic imaging bundle with empty microwells.
Figure 3:
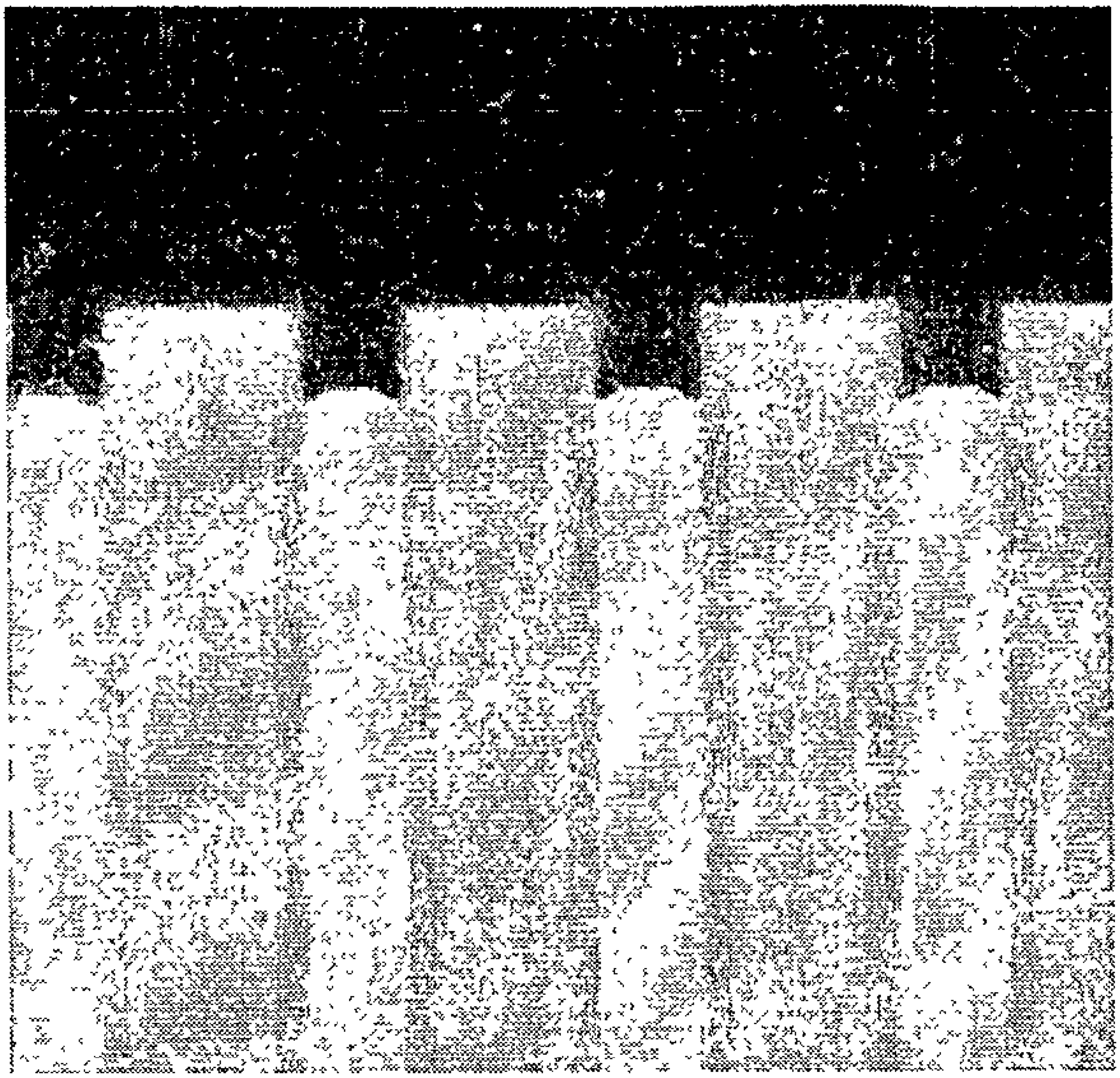
FIG. 3: SEM image of cross section of optical imaging bundle.

In another embodiment, lenses are fabricated when the optical fiber bundle is chemically etched, as described above, to create a cavity or a microwell (FIG. 2) on the end of each individual fiber in the bundle. The etching results in a microwell with a lens-like curvature on the bottom of the well (FIG. 3). In another embodiment of the invention, chemical etching is used to create tapered imaging fiber bundles. For example, U.S. Pat. No. 6,200,737, herein incorporated by reference, describes methods for the fabrication of microstructures using imaging optical fibers and photopatterning techniques, which can used to form a lens at the fiber terminus. Using different etching solutions and reaction times, a more dome-shaped, tapered fiber can be formed (Pantano (1996)).

Figure 4:
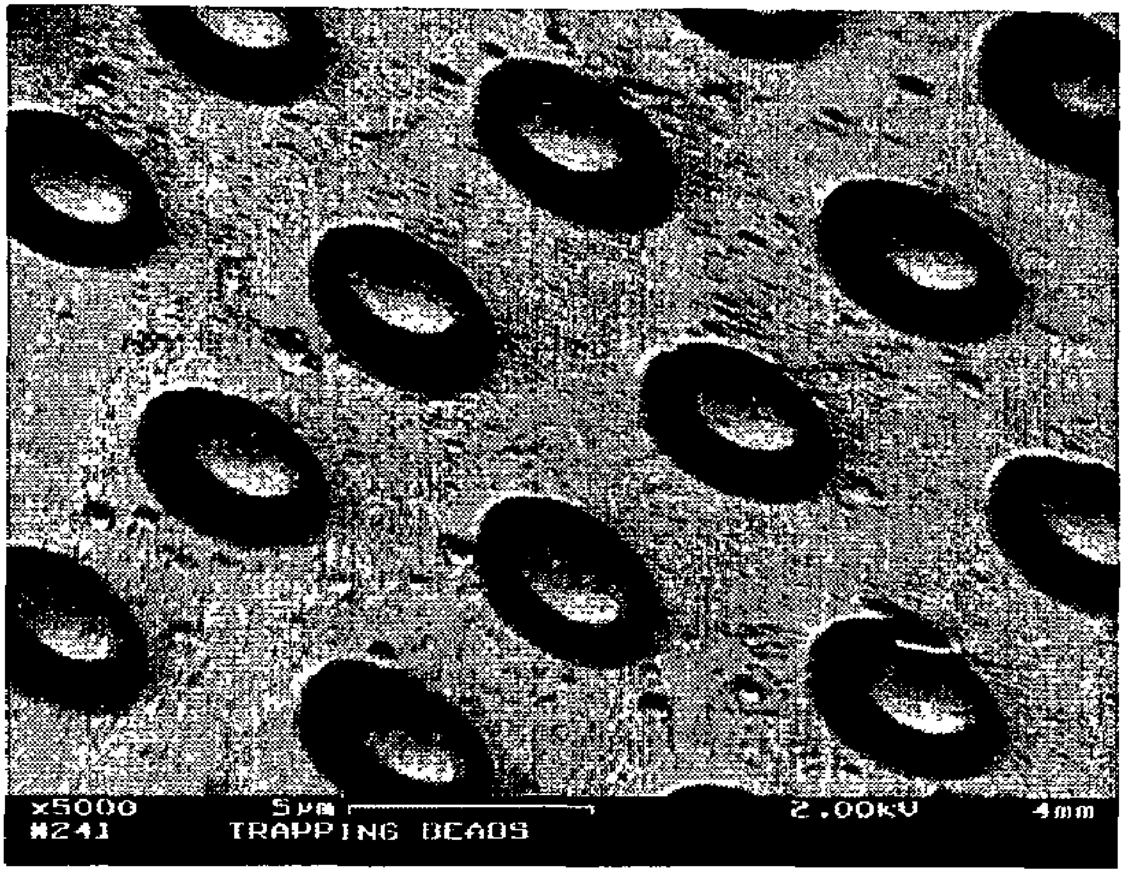
FIG. 4: FE-SEM image of etched fiber optic imaging bundle filled with ball lenses.

In another embodiment of the invention, the etched optical fiber bundle or capillary conduit is filled with microsphere ball lenses as shown in FIG. 4. The ball lenses are used as focusing elements. For example, Wu and Whitesides (2001) used microspheres to fabricate an array of lenses. Aizenberg et al. (2001) report a regular array of calcite microlenses in brittlestars.

Each optical fiber or conduit may be individually clad axially along its length. The cladding may be any material that has a lower refractive index and prevents the transmission of light energy photons to the external environment. The cladding may thus be composed of a variety of different chemical formulations including various glasses, silicones, plastics, cloths, platings and shielding matter of diverse chemical composition and formulation. Methods of cladding including deposition, extrusion, painting and covering are known in the art, and any of these known processes may be chosen to meet the requirements and convenience of the user.

The number of strands in an array will be determined primarily by the number of particles that will be analyzed or separated because of the correspondence between the number of fibers and the number of particles that can be processed. For clinical purposes, it is desirable to be able to process at least about $10^6$ cells, more usually about $10^7$ cells, and in some cases as many as about $10^8$ or more cells. A single large array of fibers may be constructed, or it may be broken down into, for example, arrays of about $10^4$, $10^5$ or $10^6$ fibers. For other purposes, smaller number of cells and particles may be analyzed, for example using arrays of about 10, $10^2$ or $10^3$ fibersor one could use only a part of a larger array.

Light System

In devices for optical trapping, a light source will be provided to generate the trapping beams, where the light source is a laser beam or other very high intensity light sources capable of applying the necessary forces needed to carry out the optical trapping effect needed to manipulate a particle. The light source may provide for continuous wave or pulsed wave light. For optical trapping, in some embodiments a pulsed wave is selected, such that the light is pulsed at a rate where the particles are not released between pulses. The wavelength of light is selected based on the specific requirements of the sample to be analyzed, preferable where the absorption coefficient of the sample is sufficiently low to prevent damage to the sample (unless the sample is to be intentionally ablated with the light source). The trapping light source is operably connected to the optical array at the proximal terminus, e.g. through a micromirror array, etc. It will be understood by those of skill in the art that an operably connected light source need not, although it may be, proximal to the array.

For optical trapping, any wavelength in the visible and infrared and near infrared (1–10 $\mu$m) can be used. For trapping of cells and other biological material, it is preferable to use wavelengths in the infrared/near infrared range. This has the benefit of allowing the use of the visible range for interrogation, without interference of the trapping light, and because of lower absorption by cells, which minimizes cellular damage. Preferably a wavelength is selected such that the light is not significantly absorbed by sample, to avoid damaging the sample. Trapping forces required for individual particles range from about 5 mW to about 100 mW, depending on the size of the particle. For example, see Table 1.

For both optical trapping and photoactivation trapping, the methods and devices of the invention will utilize a light system for collecting information about the optical properties of the trapped particles. For optical trapping devices, two light sources may be used in parallel; a laser or other high intensity light source to provide the optical trapping, and a broad band white light source, e.g. an arc lamp, mercury or xenon light source, etc., for the interrogation of the trapped particles. Alternatively, the trapping light source may also be used for interrogation, at a different wavelength, where two or more wavelengths are launched down the fiber for trapping an interrogation. For photoactivation methods, only a single light source is required.

A variety of configurations may be used in the light sources. For interrogation, the light source may be delivered at the distal terminus, where a detector may be located also at the distal end, or may be located at the proximal end. Alternatively, the light source for interrogation may be operably connected to the proximal end of the array, where detection can be at the distal or the proximal terminus. For example, a light source and detectors may be located underneath the trapped cells at the distal terminus of the fiber.

The optical array may be permanently or removably attached to a detector and to a light source for interrogation. The detector may comprise one or more lenses for focusing and enhancement of an optical signal transmitted along the optical array. The detector may additionally comprise a device for transforming the optical signal into a digital or analog electrical signal. Preferred detectors include phototubes (photomultipliers), diode arrays, or charge coupled devices (CCDs). A CCD (or other) camera may be focused at the proximal terminus to simultaneously read signals from all of the optical array while permitting individual evaluation of the signal from each fiber or conduit, or group of fibers and conduits.

For example, light from a suitable lamp can be collimated by a condensing lens, passed through an excitation filter, reflected by a dichroic mirror, and focused onto the proximal end of an imaging fiber with a microscope objective. A neutral density filter may be employed for adjustment of excitation light intensity. The imaging fiber is precisely positioned to transmit excitation light to the optical fiber array at the distal terminus. The emitted fluorescence light from the cells is returned through the fiber, through a dichroic mirror, filtered through an emission filter, and detected by a suitable detector, for example a charge coupled device (CCD) camera. A magnification lens may be employed if necessary. An alternative method for detection positions the detection optics at the distal (far) end of the fiber, with the detector focused on the fiber surface. Appropriate filters and lenses could be used to select light at emission wavelength.

Information gathered from the particles is input to a computer, or data processing element. Data gathering by the computer consists of the collection of emitted light from the cells, generally converted to a digital signal. Microprocessors can also serve to compute the selection of particles for manipulation, for example by calculating the background levels of a fluorescent signal, calculating which particles exceed the background, and targeting specific particles. The microprocessor may also collect and analyze data from fluorescence readings in order to plot the distribution of cell surface phenotypes, and the like.

In arrays designed for optical trapping methods, each fiber may be illuminated with an individually controllable beam of light at the proximal end, which serves to provide a focused light beam at the distal end, and which can be individually switched for selective release of cells. Examples of suitable light sources include fast scanning laser system, masks, etc. In one embodiment of the invention, the individually addressable light source is provided by light reflected from a digital micromirror device, or DMD. Alternatively a microhole array is used. DMD chips contain an array of electrostatically actuated tiltable aluminum micromirrors that each flip through an angle of plus or minus ten degrees in response to the state of an underlying CMOS memory cell. Such devices are well known and commercially available, for example see Hornbeck, U.S. Pat. Nos. 5,018,256; 5,216,537; and 5,583,688, herein incorporated by reference. The geometry may be designed to provide a 1 to 1 correspondence between mirrors and fibers in the array. Alternatively, multiple mirrors may direct light to a single fiber, for example about 1:10, 1:100, 1:1000, etc. correspondence. A second light beam, or the same beam filtered at a different wavelength, may also be provided, which allows for interrogation of the cells, either through signals detected by optics located at the distal (far) end of the fiber with the detector focused on the fiber surface, or transmitted in part through the fiber to a detecting device.

A DMD chip is a pixelated, micromechanical spatial light modulator formed monolithically on a silicon substrate using a standard CMOS process. The mirror structures are fabricated after the completion of the CMOS process flow, e.g. from a highly reflective aluminum alloy. Each mirror is suspended over an air gap by two thin, torsion hinges supported by posts that electrically are connected to an underlying bus.

The micromirrors are arranged in an x-y array, and the chip also contains row drivers, column drivers and timing circuitry. The addressing circuitry under each mirror pixel is a memory cell that divides two electrodes under the mirror with complementary voltages. The electrodes are arrayed on opposite sides of the rotational axis that turns through the torsion bar attachments. Depending on the state of the SRAM cell the mirror is electrostatically attracted by a combination of the bias and address voltages to one of the other address electrodes. The mirror rotates until its tip touches on a landing electrode fabricated from the same level of metal as the electrode. The electrode is held to the same potential as the mirror.

A mirror rotated to the on position reflects incoming light into the pupil of the projection lens and through the optical fiber, thereby providing an optical trapping beam. When the mirror is rotated to the off position, the reflected light misses the pupil of the projection lens, and the light does not project through the optical fiber, such that particles are not trapped initially, or trapped particles, are released.

Devices

Figure 1B:
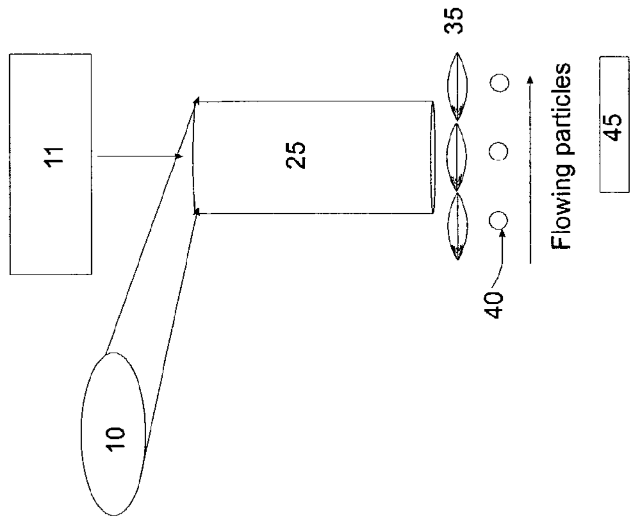
Figure 1C:
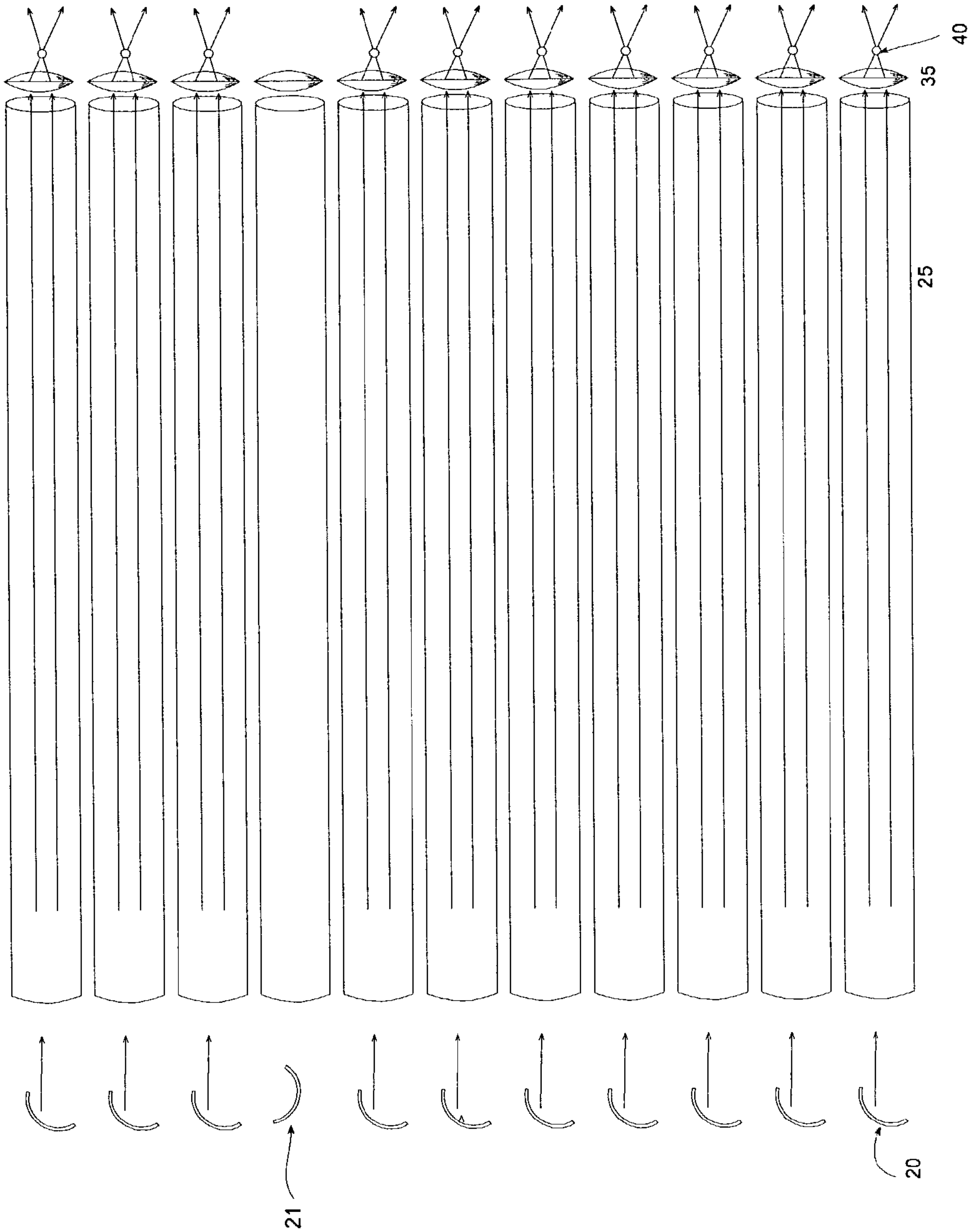

FIGS. 1A, 1B and 1C depict devices for optical trapping. The optical trapping means of the present invention captures, holds, and releases a selected particle by a three-dimensional restrictive force. An incident light beam 15, from a source 10, is aimed at a micromirror 20, which reflects the light to an optical fiber or conduit 25. The light beam travels through the fiber or conduit until it reaches the light focusing element 35, which may be a lens, microbead, etc. The light is focused so as to trap a particle 40. The device may comprise a microscope objective 11, and a camera 45. FIG. 1C depicts an array of such fibers, where mirror 21 has been turned to the off position, and thereby no longer retains a particle.

Figure 5:
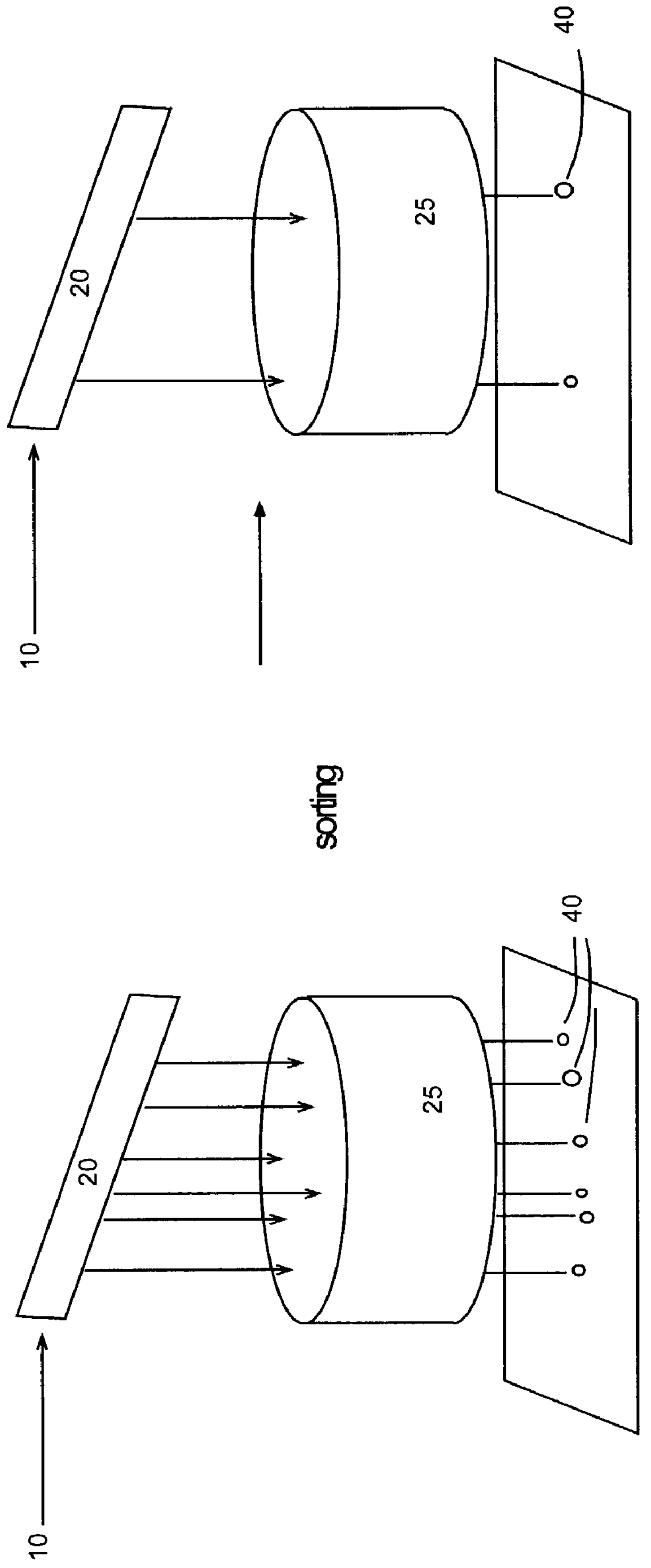
FIG. 5: Schematic of tweezer array incorporating a micromirror device.

The optical tweezer array system shown in FIG. 5 incorporates a laser light source 10, micromirror array device 20, and fiber optic imaging bundle 25 into an inverted microscope. The laser beam is directed into the micromirror array. Each mirror in the array can reflect the laser light into a particular fiber in the imaging bundle. By switching a mirror on or off, laser light can be controlled to each individual fiber, thereby controlling the orientation of the tweezer array and creating various spatial arrangements of microparticles 40.

Figure 6:
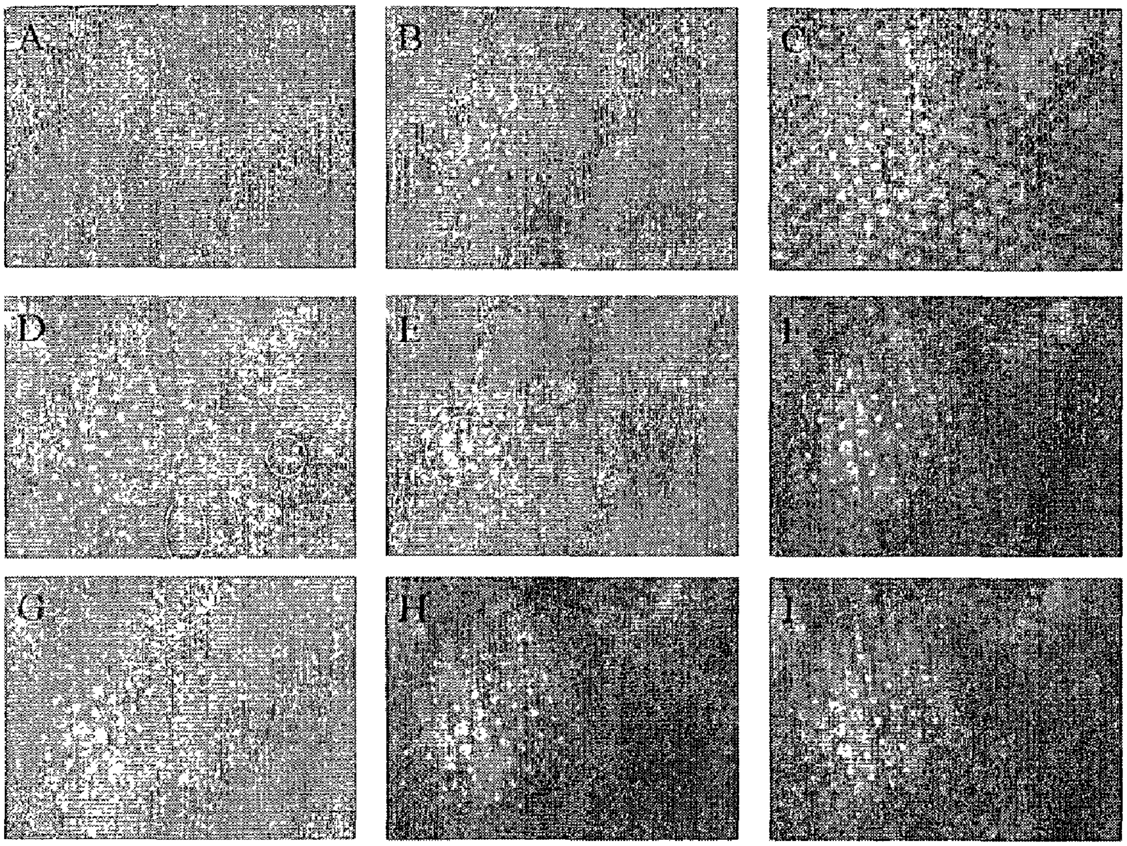
FIG. 6: (A) Tweezer array is off, microspheres freely flowing (B, C) Tweezer array is on (D) Microspheres flowing towards the tweezer array (E through I) Successive trapping of three, four, five, and six microspheres in a hexagonal pattern by the optical tweezer array. Trapped particles seen as dots in center of each illuminated fiber.
Figure 7:
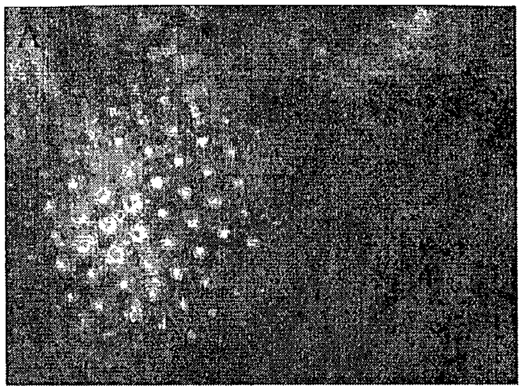
FIG. 7: (A) Microspheres trapped by the optical tweezer array (B) Tweezer array is turned off, microspheres are subsequently released (C) Microspheres freely flowing without influence from the optical tweezer array.
Figure 7:
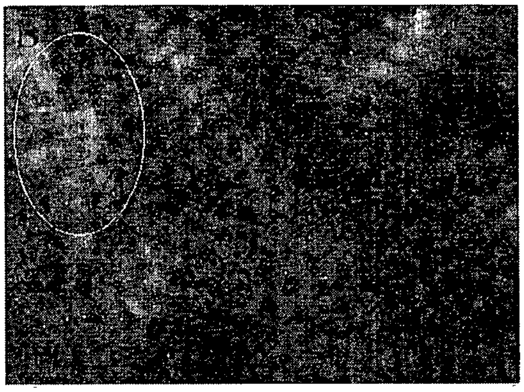
Figure 7:
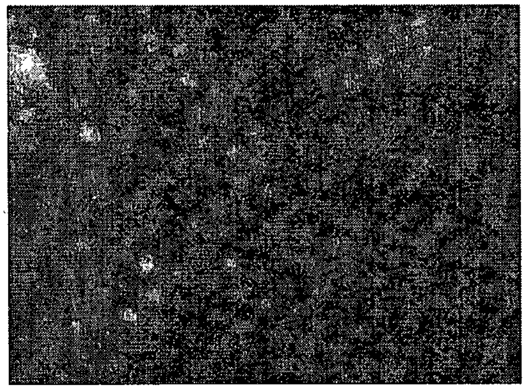
Figure 8:
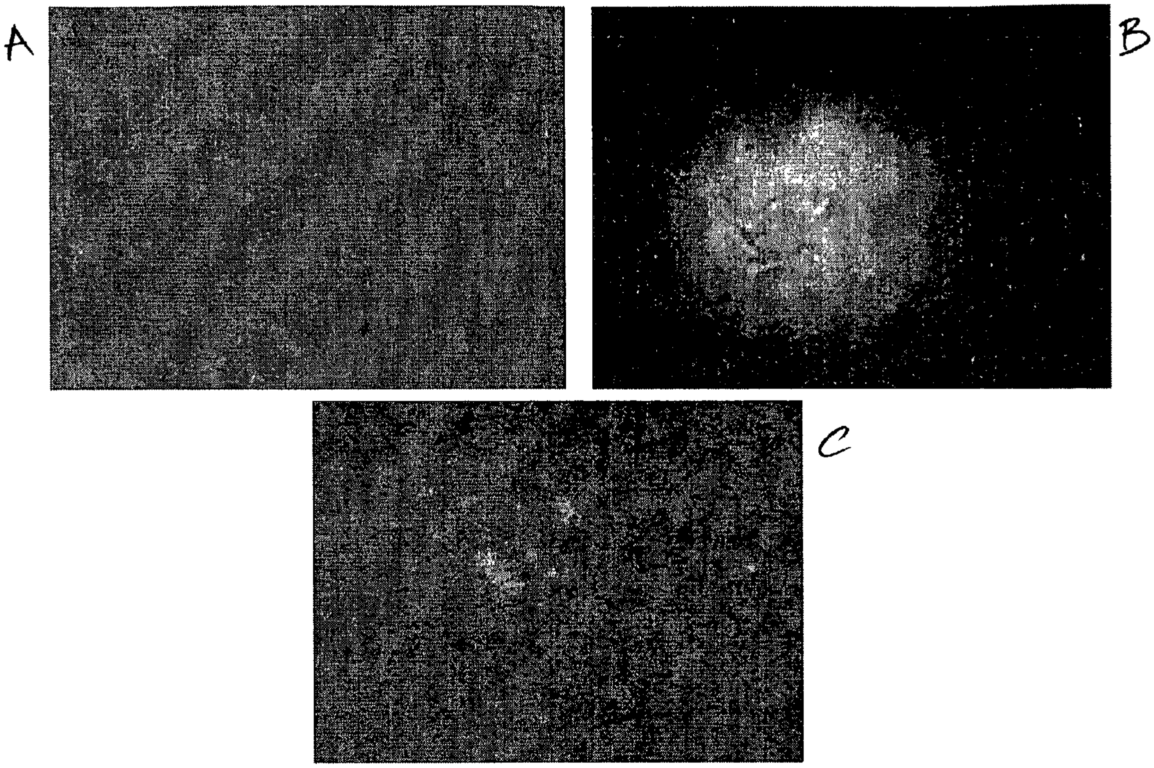
FIG. 8: Trapping of bacteria cells (A) Optical tweezer array is off, bacteria cells freely floating (B) Trapping of bacteria cells by optical tweezer array (C) Release of bacteria cells by turning off the tweezer array.
Figure 9:
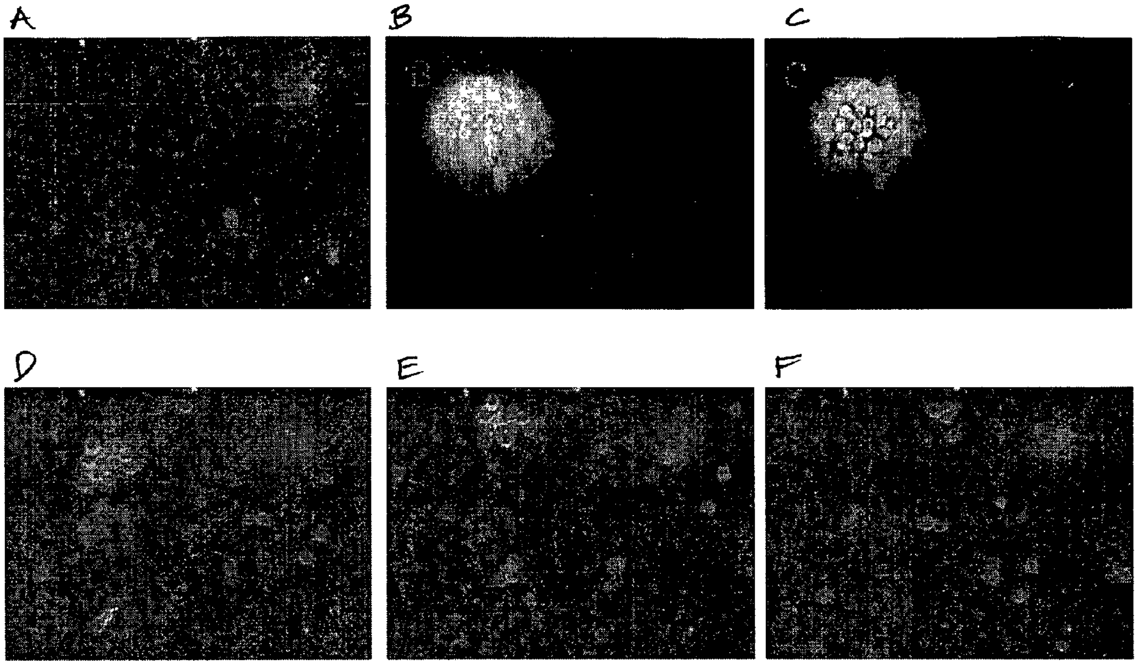
FIG. 9: Trapping of Yeast Cells (A) Optical tweezer array off, yeast cells freely floating (B, C) Trapping of yeast cells by tweezer array (D through F) Release of yeast cells after the tweezer array is turned off.

In FIG. 6 an array of microspheres trapped by the tweezer array is shown. The microspheres (4.5 μm diameter silica beads) flow past the optical tweezer array. When the trap (light) is not on, the beads float past the imaging fiber bundle. When the trap is on, the tweezer array traps the particles of interest, as shown in FIG. 6, while the others flow away due to the flow force of the peristaltic pump. When the laser light is turned off, the trapped particles are free to flow away as shown in FIG. 7. Similarly, the optical tweezer array can also trap bacteria and yeast cells as shown in FIGS. 8 and 9, respectively.

Figure 10A:
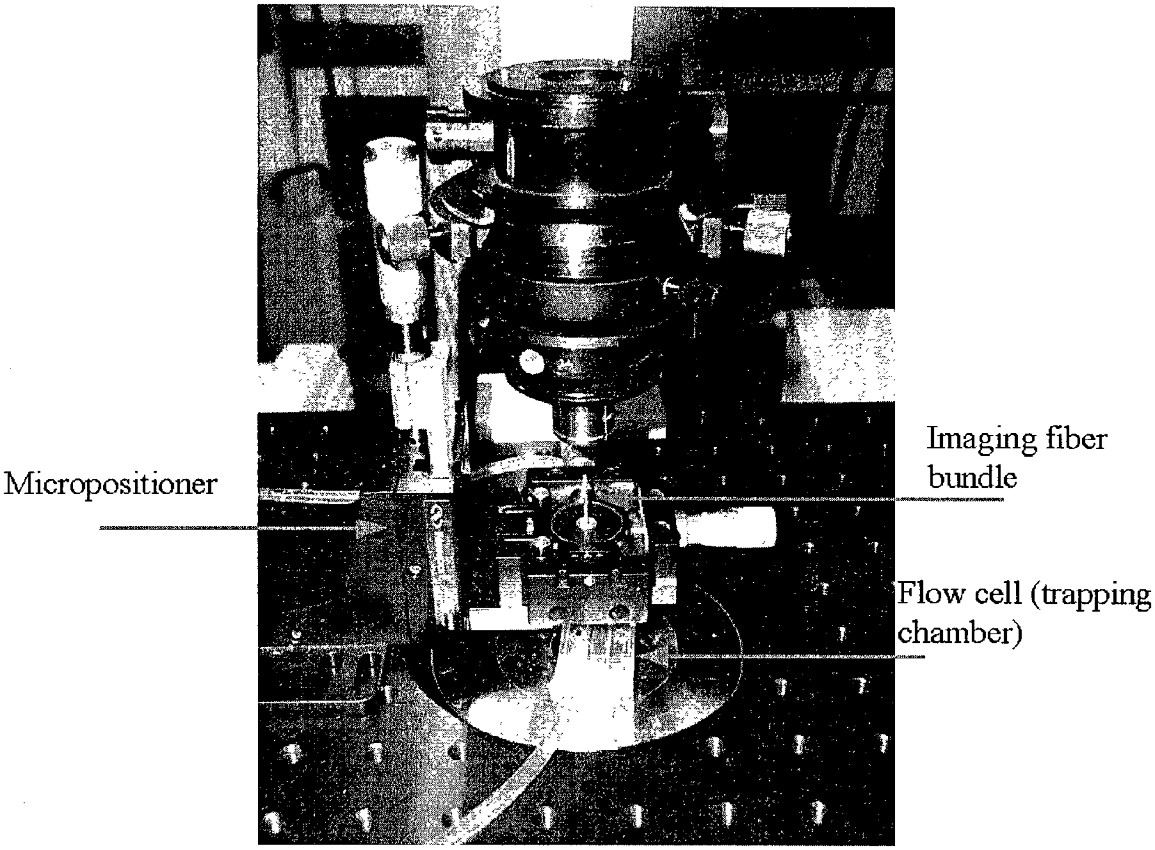
FIG. 10A, 10B and 10C: Experimental setup for fiber optic tweezer array.
Figure 10B:
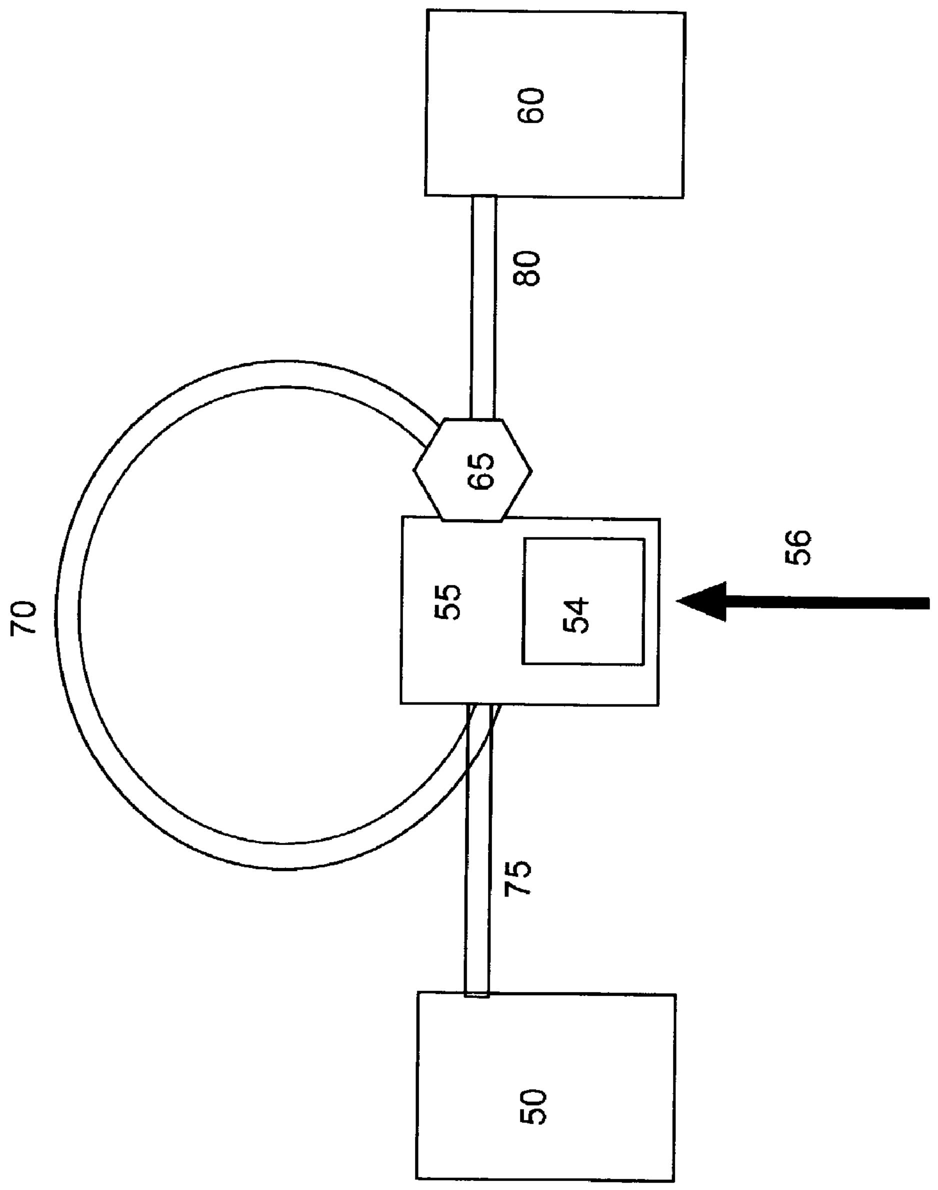

In one embodiment a separation device is provided, which includes the optical array. The device assembly may include the array, optionally within a sealed container, and may further include a sample vessel 50 in fluid communication 75 with a flow cell 55 comprising an optical array 54 in which the particles are exposed to light fields and forces 56, optionally in fluid communication 80 with a collection vessel 60 and a pumping means 65. The particles may be recirculated 70 over the flow path, as shown in FIGS. 10A and 10B.

Figure 10C:
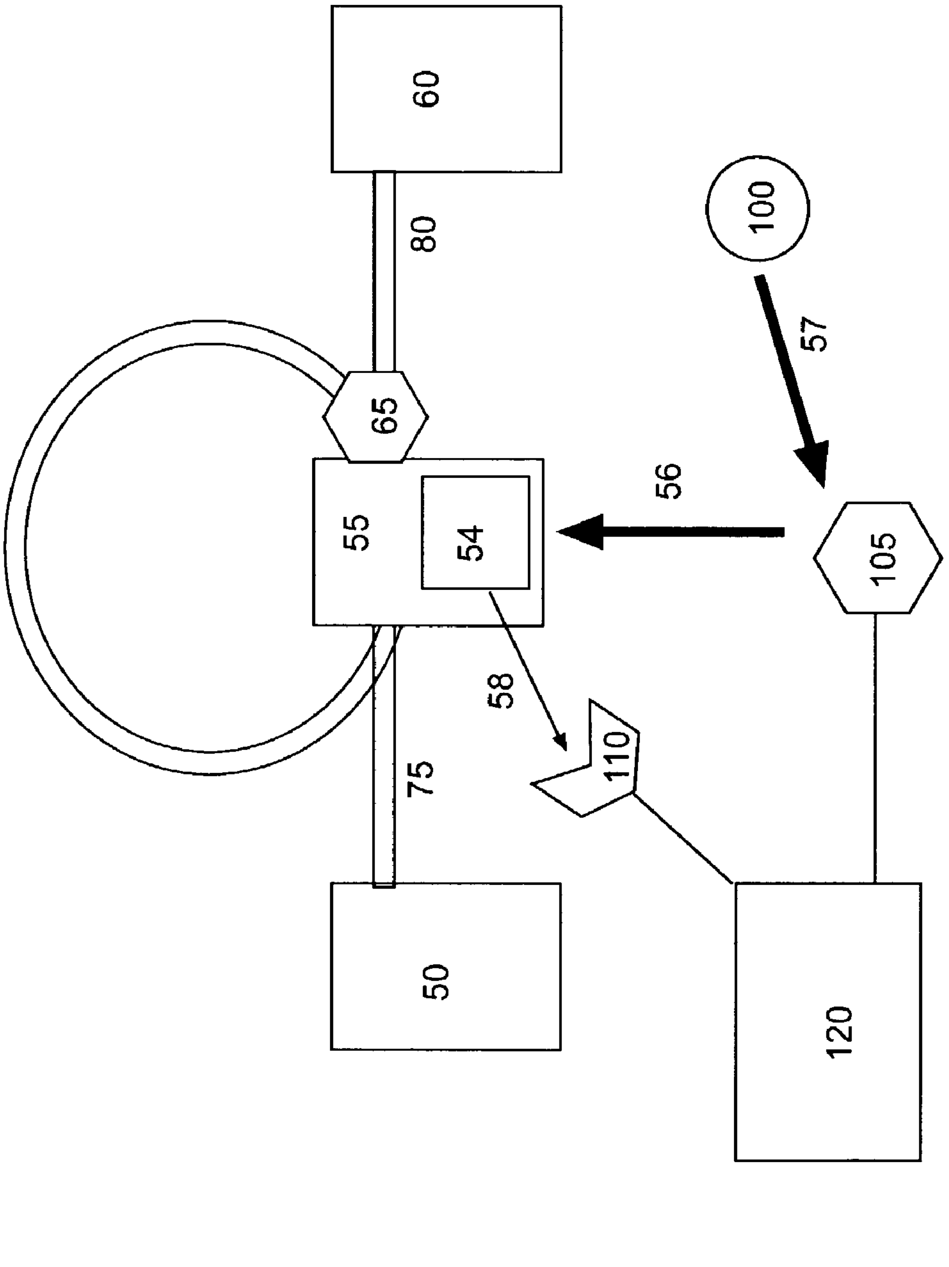

The device may further comprise, shown in FIG. 10C, a light source 100 that emits one or more beams of light 57, and a light controlling device 105, which light controlling device may switch on or off light 56 to the optical array, the light controlling device usually being capable of switching on or off light to specific fibers in the array. The device may comprise a light detecting element 110, which receives emitted light 58 from particles trapped on the array. It will be understood by those of skill in the art that the placement of the device in the figure is arbitrary, as a number of configurations for the light detection system are possible, as discussed herein. Signals from the light detection element are usually provided to a data processing element 120, which data processing element may compile information, and may also control the light controlling device 105.

The optical imaging bundle may be inserted at a 90-degree angle relative to the bottom of the sample chamber. The array typically receives a suspension of particles suspended in fluid from the sample vessel. The collection vessel is provided for subsequently receiving the released particles from the array. The device may further include an agitation assembly or pump for agitating the contents of the array. The agitation assembly is responsive to a drive signal for varying the amount of agitation of the contents of the device.

Fluidic devices may comprise integrated channels for the flow of fluids and reactants within the device, where such a device has an integrated format, i.e. the body structure of the device comprises an aggregation of separate parts, e.g., capillaries, joints, chambers, layers, etc., which are appropriately mated or joined together. Typically, the devices will comprise a top portion, a bottom portion, and an interior portion, wherein the interior portion substantially defines the channels and chambers of the device. The materials are generally selected for their compatibility with the full range of conditions to which the fluidic devices may be exposed, including pH, temperature, salt concentration, and application of electric fields and light fields. The device may be comprised of polymeric materials, e.g., plastics, such as polymethylmethacrylate (PMMA), polycarbonate, polytetrafluoroethylene (TEFLON.TM.), polyvinylchloride (PVC), polydimethylsiloxane (PDMS), polysulfone, and the like. Such devices are readily manufactured from fabricated masters, using well known molding techniques, such as injection molding, embossing or stamping, or by polymerizing the polymeric precursor material within the mold. Such polymeric substrate materials are preferred for their ease of manufacture, low cost and disposability, as well as their general inertness to most extreme reaction conditions.

The device is optionally connected to or interfaced with a processor, which controls the flow system and the optical components; e.g. micromirror array, light source etc., and stores and/or analyzes signals from trapping events. The processor in turn forwards the data to computer memory (either hard disk or RAM) from where it can be used by a software program to further analyze, print and/or display the results.

A device comprising an optical array may be used for manipulation of particles in a closed sterile field manner. Closed sterile field operation is particularly important when the array is to be used in connection with clinical procedures. The fluid pathways are closed or sealed from the environment, leading from a sample container to a container enclosing the optical array. Such a pathway can include a series of tubing conduits, filters and vessels, all of which are connected together so as to prevent exposure to the environment. Each of these containers can be configured to permit coupling to other components in order to achieve the desired separation goal and is configured to permit aseptic access. Another aspect contributing to the closed sterile field nature of the device involves providing all components that contact the target particles as sterile, non-pyrogenic, single-use components, or easily sterilized components. The optical array in the device can optionally be provided pre-loaded with a suitable medium for cells, and with such binding agents as may be utilized in a procedure. This configuration simplifies the procedure and reduces the risk of contamination.

Particles

The methods and devices of the invention may be used in the trapping, analysis and manipulation of a variety of particles. For optical trapping, the primary requirement is that the particle have a refractive index higher than that of the medium in which it is suspended. Particles may range in size, from at least about 10 nm in diameter, usually at least about 50 nm in diameter, more usually at least about 100 nm in diameter, and not more than about 500 μm in diameter, usually not more than about 250 μm in diameter, more usually not more than about 100 μm in diameter. Particles of interest are frequently in the size range of from about 1 μm, about 5 μm, or about 10 μm, to about 50 μm, or about 25 μm in diameter.

The methods of the invention may be applied to a variety of dielectric particles, within the limitations of size as indicated above, including cells, viruses, sub-cellular particles, as well as fabricated particles, e.g. silica, plastics such as polymethylmethacrylate, polycarbonate, polytetrafluoroethylene, polyvinylchloride, polydimethylsiloxane, polysulfone, etc. Fabricated particles find use as calibration controls, and as substrates for binding agents of interest, e.g. chemical libraries, binding moieties, and the like.

Where the particles are cells, the methods of the present invention can employ naturally occurring cells and cell populations, genetically engineered cell lines, cells derived from transgenic animals, etc. Virtually any cell type and size can be accommodated by matching the cell size to individual optical fiber optic core diameters and etching conditions. Suitable cells include bacterial, fungal, plant and animal cells. In one embodiment of the invention, the cells are mammalian cells, e.g. human cells; particularly complex mixtures of mammalian cells, i.e. where two or more cell types having distinguishable phenotypes are present. Examples of complex cell populations include naturally occurring tissues, for example blood, liver, pancreas, neural tissue, bone marrow, skin, and the like. Some tissues may be disrupted into a monodisperse suspension to allow isolation of a particular cell subset, such as the separation of tumor infiltrating lymphocytes from a tumor mass, the separation of islet cells from pancreatic tissue, etc. Alternatively, the complex cell population may be a cultured population, e.g. a culture derived from a complex population, or a culture derived from a single cell type where the cells have differentiated into multiple lineages, or where the cells are responding differentially to stimulus.

In one embodiment of the invention, the complex cell population comprises hematopoietic cells, for example peripheral blood, bone marrow, blood from the umbilical cord or placenta, fetal blood, leukopheresis products, etc. Of particular interest are populations comprising hematopoietic stem and progenitor cells. Other stem and progenitor cells of interest for analysis and separation include mesodermal stem and progenitor cells, neural crest stem and progenitor cells, embryonic stem and progenitor cells, liver stem and progenitor cells, pancreatic stem and progenitor cells, mesenchymal stem and progenitor cells, etc.

The particles that are being analyzed and/or manipulated may comprise specific binding members, optionally comprising an optical label, which may include fluorophores, chromophores, stains or dye compounds. The term "specific binding member" as used herein refers to a member of a specific binding pair, i.e. two molecules, usually two different molecules, where one of the molecules through chemical or physical means specifically binds to the other molecule. The complementary members of a specific binding pair are sometimes referred to as a ligand and receptor; or receptor and counter-receptor.

Binding pairs of interest include antigen and antibody specific binding pairs, peptide-MHC-antigen complexes and T cell receptor pairs, biotin and avidin or streptavidin; carbohydrates and lectins; complementary nucleotide sequences; peptide ligands and receptor; effector and receptor molecules; hormones and hormone binding protein; enzyme cofactors and enzymes; enzyme inhibitors and enzymes; and the like. The specific binding pairs may include analogs, derivatives and fragments of the original specific binding member. For example, an antibody directed to a protein antigen may also recognize peptide fragments, chemically synthesized peptidomimetics, labeled protein, derivatized protein, etc. so long as an epitope is present.

Immunological specific binding pairs include antigens and antigen specific antibodies; and T cell antigen receptors, and their cognate MHC-peptide conjugates. Suitable antigens may be haptens, proteins, peptides, carbohydrates, etc. Recombinant DNA methods or peptide synthesis may be used to produce chimeric, truncated, or single chain analogs of either member of the binding pair, where chimeric proteins may provide mixture(s) or fragment(s) thereof, or a mixture of an antibody and other specific binding members. Antibodies and T cell receptors may be monoclonal or polyclonal, and may be produced by transgenic animals, immunized animals, immortalized human or animal B-cells, cells transfected with DNA vectors encoding the antibody or T cell receptor, etc. The details of the preparation of antibodies and their suitability for use as specific binding members are well-known to those skilled in the art.

Antibodies of particular interest include those that recognize stem cells. For example, human hematopoietic stem cells may be positively selected using antibodies specific for CD34, AC-133, thy-1, SCAH-1 and SCAH-2; or negatively selected using lineage specific markers which may include glycophorin A, CD3, CD24, CD16, CD14, CD38, CD45RA, CD36, CD2, CD19, CD56, CD66a, and CD66b; T cell specific markers, tumor specific markers, etc. A number of other selective ligands are of interest, for example markers found on viruses, protozoan parasites, bacteria and other pathogens, tumor specific antigens, antigens marking progenitor cells in a variety of mammalian tissues, etc.

The binding member may be directly or indirectly labeled with an optically detectable label. Of particular interest as a label are fluorophores. Fluorescence is a physical phenomenon based upon the ability of some molecules to absorb and emit light. With some molecules, the absorption of light at specified wavelengths is followed by the emission of light from the molecule of a longer wavelength and at a lower energy state. Such emissions are called fluorescence and the emission lifetime is said to be the average period of time the molecule remains in an excited energy state before it emits light of the longer wavelength. Substances that release significant amounts of fluorescent light are termed "fluorophores". This broad class includes fluorescein isothiocyanate (FITC), fluorescein di-galactose (FDG); lissamine, rhodamine, Texas Red, phycoerythrin, allophycocyanin, 6-carboxyfluorescein (6-FAM), 2,7-dimethoxy-4,5-dichloro-6-carboxyfluorescein (6-JOE), 6-carboxy-X-rhodamine (6-ROX), 6-carboxy-2,4,4',5',7,7'-hexachlorofluorescein (6-HEX), 5-carboxyfluorescein (5-FAM) or N,N,N,N-tetramethyl-6-carboxyrhodamine (6-TAMRA); dansyl chloride; naphthylamine sulfonic acids such as 1-anilino-8-naphthalene sulfonic acid ("ANS") and 2-p-toluidinylnaphthalene-6-sulfonic acid ("TNS") and their derivatives; acridine orange; proflavin; ethidium bromide; quinacrine chloride; and the like.

Highly luminescent semiconductor quantum dots (zinc sulfide-capped cadmium selenide) have been covalently coupled to biomolecules for use in ultrasensitive biological detection (Stupp et al. (1997) *Science* 277(5330):1242–8; Chan et al. (1998) *Science* 281(5385):2016–8). Compared with conventional fluorophores, quantum dot nanocrystals have a narrow, tunable, symmetric emission spectrum and are photochemically stable (Bonadeo et al. (1998) *Science* 282(5393):1473–6). The advantage of quantum dots is the potential for exponentially large numbers of independent readouts from a single source or sample.

Molecules such as fluorophores, which absorb light energy, do so at individual wavelengths and are characterized by a distinctive molar absorption (extinction) coefficient at that wavelength. Chemical analyses utilizing absorption spectroscopy using visible and ultraviolet light wavelengths in combination with the absorption (extinction) coefficient allow for the determination of concentration of the label present on a specific cell. The most common use of absorbance measurement is to determine concentration which is calculated in accordance with Beer's law; accordingly, at a single absorbance wavelength, the greater the quantity of the composition which absorbs light at the single wavelength, the greater the optical density for the sample. In this way, the total quantity of light absorbed is directly correlated with the quantity of the composition in the sample.

Photoactivation. As used herein, the term photoactivation is intended to encompass light induced changes in biological and chemical structures. Changes of interest include cleavage of chemical bonds, which can result in, for example, the conversion of a pro-toxin to a toxin, cleavage of a linker joining two chemical moieties, which can result in the release of a bound cell, and the like. Alternatively, chemical bonds can be formed through light activation, e.g. resulting in the crosslinking of two chemical entities. Photoactivation may also include the ablation of targeted cells, by direct light delivery, or through alterations in chemical bonds of biologically active compounds.

Photorelease and photoattachment. Cells or particles can be specifically released or bound to an optical fiber through photoactivation. For example, attachment may include the photoactivation step of cross-linking a moiety present on the cell with a moiety present on the optical fiber. Conversely, cells bound to the optical fiber through a photolabile linkage may be released through photoactivation.

In one embodiment of the invention, a binding member, e.g. an antibody or other specific binding member as described above, is covalently attached to the distal terminus of the optical fiber through a photocleavable linker. Photocleavable or photolabile moieties that may be incorporated into the linker are known in the art and commercially available (e.g. from Pierce, Rockford, Ill.), and include: o-nitroarylmethine and arylaroylmethine, as well as derivatives thereof, and the like. Photocleavable linkages that can be activated by exposure to light are described, for example, in U.S. Pat. No. 5,739,386. See, for example, Hazum et al. (1981) in *Pept. Proc. Eur. Pent. Symp.,* 16th, Brunfeldt, K (Ed), pp. 105–110, which describes the use of a nitrobenzyl group as a photocleavable protective group for cysteine; Yen et al. (1989) *Makromol. Chem* 190:69–82, which describes water soluble photocleavable copolymers, including hydroxypropylmethacrylamide copolymer, glycine copolymer, fluorescein copolymer and methylrhodamine copolymer; Goldmacher et al. (1992) *Bioconj. Chem.* 3:104–107, which describes a cross-linker and reagent that undergoes photolytic degradation upon exposure to near UV light (350 nm); and Senter et al. (1985) *Photochem. Photobiol* 42:231–237, which describes nitrobenzyloxycarbonyl chloride cross linking reagents that produce photocleavable linkages. The selected linker will depend upon the particular application and may be empirically selected.

Cells may also be attached to the optical fibers through the photoactivation step, where a moiety present on the cell surface is cross-linked by photoactivation to a moiety present on the proximal end of the optical fiber. Crosslinking with heterobifunctional reagents is accomplished, for example, by binding a site on a linker to an amino group via an amide bond, leaving a photoactivatable site unbound. Upon photoactivation by the use of ultraviolet or visible irradiation, the photoactivatable site is converted to a species of very high chemical reactivity, which then forms a covalent linkage with another amino group. A common method used for photoactivation of heterobifunctional compounds is irradiation with a short wave ultraviolet light. Bifunctional crosslinkers that may be used in the method of the invention include but are not limited to 4-azidobenzoic acid N-hydroxysuccinimide ester (HSAB) and 6-(4-azido-2-nitrophenyl-amino)hexanoic acid N-hydroxysuccinimide ester (SANAH). Exemplary photoactivatable compounds containing a vinyl group capable of participating in free radical polymerization reactions and which can upon photoactivation bind to biomolecules may be selected from the group consisting of bis(((2,6-dinitrobenzyl)oxy)carbonyl)allyl amine (2,6-DOCA), bis(((2-nitrobenzyl)oxy)carbonyl)allyl amine (2-NOCA), LC-ASA allyl amine (LC-ASA Amine) or mixtures thereof. An alternative method of crosslinking is described in U.S. Pat. No. 5,482,867, which utilizes caged compounds that are freed by a photoactivation step.

In one embodiment of the invention, photoactivation is achieved by attaching one end of the photoactivator to one of the selection Abs. Light would then cause the cells containing the cognate antigen to bind to a fiber whose the surface had been treated, e.g. with a suitable polymer layer, to allow the reactive group to bind. The trapped cells could then be released by a chemical treatment. For example, if the crosslinking chain contained a disulfide linkage, a rinse with reducing thiols would break the disulfide bond and release the cell from the surface. The procedure can be repeated many times without requiring the fiber surface to be recharged because the groups remaining on the fiber surface would also be reactive.

Photoablation. In one embodiment of the invention, the photoactivation step results in the death of the targeted cell, either through direct killing, or through activation of a photosensitive toxin. For direct killing, electromagnetic energy is converted into thermal energy that coagulates the cell. Where an optical trap is used, a second, controllable, light source is used as a source of photoablation energy, so that one light source maintains the optical trap, while the other selectively delivers the ablation beam.

Photoablation can be enhanced by the presence of a photosensitizer. A range of photosensitizing agents are known, including notably the psoralens, the porphyrins, the chlorins and the phthalocyanins. Such drugs become toxic when exposed to light. Photosensitizing agents may exert their effects by a variety of mechanisms, directly or indirectly. Certain photosensitizers become directly toxic when activated by light, whereas others act to generate toxic species, e.g. oxidizing agents such as singlet oxygen or other oxygen-derived free radicals, which are extremely destructive to cellular material and biomolecules such as lipids, proteins and nucleic acids. Psoralens are an example of directly acting photosensitizers; upon exposure to light they form adducts and cross-links between the two strands of DNA molecules, thereby inhibiting DNA synthesis. Porphyrins are naturally occurring precursors in the synthesis of heme, where protoporphyrin is an extremely, potent photosensitizer. Other photoactivatable compounds include antibody conjugates to toxins, e.g. pokeweed antiviral protein, ricin, etc. that are bound through a photocleavable linker. Upon light stimulation, the linker is cleaved, thereby releasing the toxin and killing the cell (see Goldmacher et. al. (1992) *Bioconjug. Chem* 3(2):104–7).

Screening Methods

Agents are screened for activity by determining the interaction between a moiety present on a trapped particle (stationary phase) and a moiety present in suspension (mobile phase), where the interaction provides for a detectable signal. For example, when a stationary phase receptor interacts with a mobile phase ligand, where the ligand comprises an optically detectable label, the interaction is detected by determining the presence of the label. The screening methods may detect and analyze interactions, and may also separate, translocate, ablate, separate, etc., particles on the basis of the interactions.

It will be understood by those of skill in the art that a variety of formats may be utilized. For example, the interaction may comprise binding between the members in the mobile and stationary phase, where the binding may be hybridization between two nucleic acids, binding between a protein and ligand, between a drug and biological molecule, between a cell and a pharmaceutically active compound, and the like. The interaction may also comprise a chemical or other physical reaction between the two. Interactions may also occur between two trapped particles, e.g. by trapping two different cell types and monitoring the effect of molecules secreted by the cells on other cells.

The stationary phase may comprise an array, or library of components, where the mobile phase comprises a uniform suspension, which may be a single suspension, or a series of different suspensions, e.g. dilutions, sets of chemical analogs, different cell types, etc. Alternatively, the stationary phase may comprise a uniform population, e.g. cells, binding members, etc., and a complex population of moieties be present in the mobile phase.

A plurality of assays may be run in parallel with different concentrations to obtain a differential response to the various concentrations. As known in the art, determining the effective concentration of an agent typically uses a range of concentrations resulting from 1:10, or other log scale, dilutions. The concentrations may be further refined with a second series of dilutions, if necessary. Typically, one of these concentrations serves as a negative control, i.e. at zero concentration or below the level of detection of the agent or at or below the concentration of agent that does not give a detectable change in binding.

Specific binding as used herein refers to a molecule that through chemical or physical means specifically binds to the other molecule, and where the binding of the members is at a substantially higher affinity than random complex formation. Binding is generally considered to be specific if it results from a molecular interaction between two binding sites, rather than from "non-specific" stickiness of the molecules. Specificity of reversible binding can be confirmed by competing off labeled ligand with an excess of unlabeled ligand according to known methods.

Compounds of interest for screening include biologically active agents of numerous chemical classes, primarily organic molecules, although including in some instances inorganic molecules, organometallic molecules, genetic sequences, etc. Candidate agents comprise functional groups necessary for structural interaction with proteins, particularly hydrogen bonding, and typically include at least an amine, carbonyl, hydroxyl or carboxyl group, frequently at least two of the functional chemical groups. The candidate agents often comprise cyclical carbon or heterocyclic structures and/or aromatic or polyaromatic structures substituted with one or more of the above functional groups. Candidate agents are also found among biomolecules, including peptides, polynucleotides, saccharides, fatty acids, steroids, purines, pyrimidines, derivatives, structural analogs or combinations thereof.

Compounds are obtained from a wide variety of sources including libraries of synthetic or natural compounds. For example, numerous means are available for random and directed synthesis of a wide variety of organic compounds, including biomolecules, including expression of randomized oligonucleotides and oligopeptides. Alternatively, libraries of natural compounds in the form of bacterial, fungal, plant and animal extracts are available or readily produced. Additionally, natural or synthetically produced libraries and compounds are readily modified through conventional chemical, physical and biochemical means, and may be used to produce combinatorial libraries. Known pharmacological agents may be subjected to directed or random chemical modifications, such as acylation, alkylation, esterification, amidification, etc. to produce structural analogs.

Methods of Cell Analysis and Separation

A population of cells, usually a complex population of cells comprising two or more distinct sub-populations, may be applied to an optical array, where the cells are distributed over the fiber distal termini and dispersed to provide approximately one cell per fiber. Preferably, the optical fiber array comprises either etched microwells or a light focusing element on each terminus, which holds the cells in place for interrogation. Each fiber or conduit is operably connected to an optical detector that collects information about the optical phenotype of each cell. By using the optical strand as a waveguide to transmit light between the cell and a detector, information is obtained about the specific optical properties of each cell, which optical properties correlate with the phenotype of the cell. Alternatively, both fluorescence and information about morphological changes in each cells can be monitored using the inverted microscope setup by switch between fluorescence and white light imaging. This information can then be used to selectively manipulate targeted cells, e.g. by release, attachment or ablation of individual cells present on the optical array.

The population of cells for analysis is obtained from an appropriate source, and dispersed into a single cell suspension. Various methods and devices exist for pre-separating component parts of the sample. These methods include filters, centrifuges, chromatographs, and other well-known fluid separation methods; gross separation using columns, centrifuges, filters, separation by killing of unwanted cells, separation with fluorescence activated cell sorters, separation by directly or indirectly binding cells to a ligand immobilized on a physical support, such as panning techniques, separation by column immunoadsorption, and separation using magnetic immunobeads. Alternatively, the methods of the present invention may be used for a pre-separation, or for multiple rounds of separation.

A preparation of nucleated cells may be made from the sample using a procedure that can separate nucleated cells from erythrocytes. The use of Ficoll-Paque density gradients or elutriation for such separations is well documented in the literature. Alternatively, the blood cells may be resuspended in a solution which selectively lyses erythrocytes, e.g. ammonium chloride-potassium; ammonium oxalate; etc., or whole blood may be used.

In most cases, the cells will be labeled with specific binding members, usually antibodies, in order to provide a fluorescent signal specific for one or more cell surface antigens. The cells are resuspended in staining medium, which can be any medium that maintains the viability and morphology of the cells. Various media are commercially available and may be used according to the nature of the cells, including Phosphate buffered saline, Dulbecco's Modified Eagle Medium (DMEM), Hank's Balanced Salt Solution (HBSS), Dulbecco's phosphate buffered saline (DPBS), RPMI, Iscove's medium, PBS with 5 mM EDTA, etc.

The antibodies or other specific binding members are added to the suspension of cells, and incubated for a period of time sufficient to bind the available antigens. The incubation will usually be at least about 2 minutes and usually less than about 30 minutes. It is desirable to have a sufficient concentration of antibodies in the reaction mixture so that the efficiency of the separation is not limited by lack of antibody. The appropriate concentration is determined by titration. Where the labeling is direct, the antibodies are labeled with a suitable fluorochrome. Where the labeling is indirect, a second stage antibody or label can be used, by washing and resuspending the cell suspension in medium as described above prior to incubation with the second stage antibodies.

The suspension of cells is applied to the optical array. When cell sterility is desired, the antibody incubations and washes may be performed in a closed container process, where the antibodies and wash liquids are added to a sterile container by means of a sterile syringe or similar device. In this way, contamination of the desired cells by air-borne microorganisms is minimized. In such a closed system, particularly where the container is a flexible bag, the mixing of cells and antibody may be improved by injecting a small amount of sterile air, at a ratio of from about 0.5 to 2 of air to liquid, into the container. The fluid may be any acceptable buffer system, and will be chosen to maintain the physiological integrity of the cells, preferably maximizing cell viability. Prior to adding cells to the microwell array, the end of the fiber optic array that contains the microwells may be pre-filled with medium. The suspended cells are allowed to settle into the wells.

The presence of a fluorescent label or other optical feature of the cells is determined by transmitting light at a suitable wavelength through the optical fibers or from the inverted microscope light source. The wavelength will be selected based on the fluorochromes used as a label. A series of excitation/emission pair interrogations may be performed, in order to interrogate a plurality of different fluorochromes. The returned light signals from the cells are detected and recorded at either the proximal or distal end.

The results of such analysis may be compared to results obtained from reference compounds, concentration curves, controls, etc. The comparison of results is accomplished by the use of suitable deduction protocols, Al systems, statistical comparisons, etc.

A database of phenotypic information can be compiled. These databases may include results from known cell types, references from the analysis of cells treated under particular conditions, and the like. A data matrix may be generated, where each point of the data matrix corresponds to a readout from a cell, where data for each cell may comprise readouts from multiple fluorochromes. The readout may be a mean, median or the variance or other statistically or mathematically derived value associated with the measurement. The output readout information may be further refined by direct comparison with the corresponding reference readout. The absolute values obtained for each output under identical conditions will display a variability that is inherent in live biological systems and also reflects individual cellular variability as well as the variability inherent between individuals.

Once the data is obtained from the cells, selective photoactivation or selective release of optically trapped cells is optionally utilized to separate cell populations. As described previously, the photoactivation step may cleave bound cells, bind cells to the array, or ablate undesired cells, i.e. the cells are fractionated either by altering their binding properties to the array, or by selective killing through light energy delivered through the optical fibers. After the photoactivation or selective release of optically trapped cells step, the unbound cells are washed away from the array. The medium in which the cells are released will be any medium that maintains the viability of the cells. Suitable media include phosphate buffered saline containing from 0.1 to 0.5% BSA, Dulbecco's Modified Eagle Medium (dMEM), Hank's Basic Salt Solution (HBSS), Dulbecco's phosphate buffered saline (dPBS), RPMI, Iscove's medium, PBS with 5 mM EDTA, etc., frequently supplemented with fetal calf serum, BSA, HSA, etc.

The desired cells can be the cells that are released from the array, which are then collected and used. Alternatively, where the desired cells are bound to the array, a second step is required to release the cells for collection, e.g. by release of optically trapped cells, proteolytic cleavage, competitive binding, e.g. by addition of free biotin to an avidin binding system, etc.

The separated cells may be used in a variety of ways for clinical and experimental purposes. For clinical uses, e.g. stem cell reconstitution, gene therapy, etc., the cells are administered in any physiologically acceptable medium, normally intravascularly, including intravenous although they may also be introduced into other convenient sites, where the cells may find an appropriate site for regeneration and differentiation. The cells may be introduced by injection, catheter, or the like.

The cells may be used in conjunction with a culture system in the isolation and evaluation of factors, growth potential, genetic variation, expression of genes of interest, genetic manipulation, etc.

In order to address the needs of research and clinical laboratories, a kit may be provided having the reagents and apparatus necessary to perform the subject methods. Such a kit will contain an optical fiber array, which may be provided in combination with a container, e.g. for sterile separation, and such tubing and bags as necessary for operation. A set-up may also be provided for the light source, detectors, microprocessor and software for analysis. Other components provided may be fluorescent labeling reagents, particles, instrument components, etc. While single arrays may be used, for large scale separation it is anticipated that multiple arrays may be run simultaneously, and an apparatus for automated or manual procedures may optionally be provided for such a purpose.

It is to be understood that this invention is not limited to the particular methodology, protocols, cell lines, animal species or genera, and reagents described, as such may vary. It is also to be understood that the terminology used herein is for the purpose of describing particular embodiments only, and is not intended to limit the scope of the present invention which will be limited only by the appended claims.

As used herein the singular forms "a", "and", and "the" include plural referents unless the context clearly dictates otherwise. Thus, for example, reference to "a cell" includes a plurality of such cells and reference to "the array" includes reference to one or more arrays and equivalents thereof known to those skilled in the art, and so forth. All technical and scientific terms used herein have the same meaning as commonly understood to one of ordinary skill in the art to which this invention belongs unless clearly indicated otherwise.

All publications mentioned herein are incorporated herein by reference for the purpose of describing and disclosing, for example, the cell lines, constructs, and methodologies that are described in the publications which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

The following examples are put forth so as to provide those of ordinary skill in the art with a complete disclosure and description of how to make and use the subject invention, and are not intended to limit the scope of what is regarded as the invention. Efforts have been made to ensure accuracy with respect to the numbers used (e.g. amounts, temperature, concentrations, etc.) but some experimental errors and deviations should be allowed for. Unless otherwise indicated, parts are parts by weight, molecular weight is average molecular weight, temperature is in degrees centigrade; and pressure is at or near atmospheric.

EXAMPLES

Example 1

The imaging fiber bundle and the trapping chamber were mounted on a modified Olympus IX-70 inverted microscope as shown in FIG. 10A. A microscope objective mount was placed in the place of the microscope condenser in order to focus, the laser beam into the imaging fiber bundle. For laser light focusing, LMPlan Olympus objectives 50×, (NA 0.50), 20×(NA 0.40), or 5×(NA 0.13) were used. The laser beam was directed from the laser output into the objective using standard optical components (Newport, Irvine, Calif.). Microparticle trapping was achieved by using 488 nm and 647 nm light from a continuous-wave Coherent Innova 70C Spectrum tunable laser or using 1060 nm Ytterbium laser light from an IR fiber laser model PYL-50M (IPG Photonics, Oxford, Mass.). The imaging fiber was held by a fiber holder connected to a micropositioner (Newport, Irvine, Calif.) that was connected to the microscope stage which allowed movement in the X, Y, and Z directions (FIG. 10). A Sony CCD-IRIS video camera or Cooke Sensicam CCD camera was used for imaging, and notch filters (Chroma Technology Corp., Brattleboro, Vt.) were used to selectively block the laser light to allow imaging with a white light source or to perform fluorescence measurements using other wavelengths. Fiber-lite illuminators were used as white light illumination (Dolan-Jener Industries, Lawrence, Mass.)

Preparation of imaging fibers for optical trapping. Three different procedures were used to fabricate an array of light focusing elements on the imaging fiber bundle face.

Chemical etching—Imaging fibers bundles (Illumina, San Diego, Calif.) composed of 24,000 individual fibers, each with a diameter of 5 $\mu$m, were used for trapping. An etching process produced an array of microwells on the imaging fiber face (Pantano (1996)). The bottom of each well has a lens shape, as shown in FIG. 3, which was used to trap 3 and 5 $\mu$m dielectric microspheres as well as bacteria and yeast cells.

Microspheres as ball lenses—Imaging fiber bundles (Illumina, San Diego, Calif.) comprised of 50,000 individual fibers, each with a diameter of 3 $\mu$m, were also used for trapping applications. The fiber optic bundle was chemically etched to produce a microwell on each individual fiber in the bundle, creating an array of microwells. Three micron silica microspheres were distributed into the microwell array such that each well contained a single microsphere, as shown in FIG. 4. Each microsphere served as a ball lens, resulting in an array of lenses that is used to produce the tweezer array. The fiber optic lens array trapped 3 $\mu$m and 5 $\mu$m dielectric microspheres.

Self focusing fibers—Imaging fiber bundles (Schott Fiber Optics, Southbridge, Mass.) containing 50,000 individual self focusing (SELFOC) fibers, each composed of graded-index (GRIN) material and each with a diameter of 3 $\mu$m, were used for trapping. The fiber face was polished using a fiber optic hand polisher and lapping film. The SELFOC lens array trapped 3 $\mu$m silica microspheres.

Figure 11:
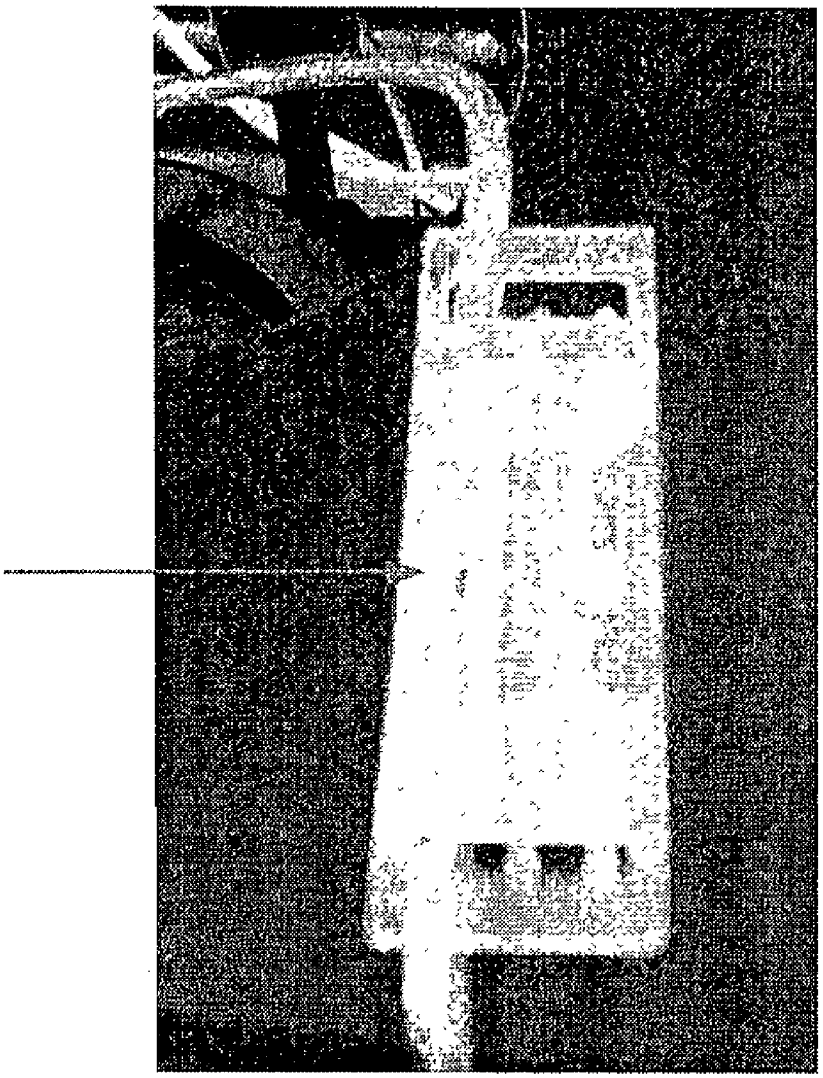
FIG. 11: Trapping chamber.

Flow system and trapping chamber. To demonstrate trapping with an imaging fiber bundle, an experimental apparatus was built to contrast the movement of trapped, motionless microparticles to untrapped, free-flowing microparticles. A trapping chamber was prepared by modifying a Stovall flow cell (Stovall Life Science, Greensbord, N.C.) by drilling a hole in the upper part of the flow cell in order to insert the imaging fiber bundle at a 90-degree angle, as shown in FIG. 11. The trapping chamber had a cover slip bottom so the microparticle flow could be visualized using an inverted microscope setup, as shown in FIG. 10A. This apparatus allowed microparticles to flow across the fiber optic imaging bundle with speeds ranging from 1 micron/second to 6.5 microns/second.

Figure 12:
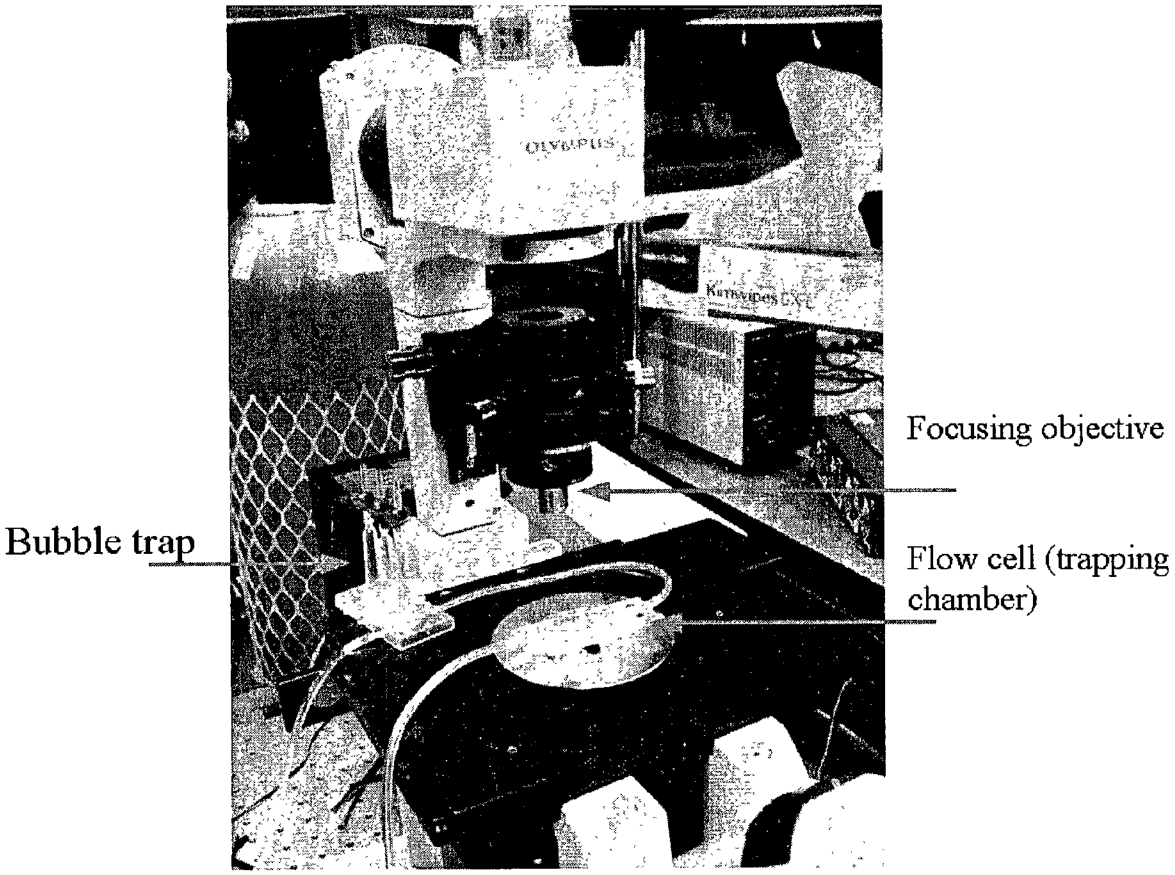
FIG. 12: Bubble trap with trapping chamber.

A laser was directed into the fiber optic lens array, illuminating a desired number of individual fibers in the bundle. When the laser was turned on, microparticles flowing across illuminated fibers stopped and trapped while untrapped particles flowed freely. A Masterflex L/S peristaltic pump drive with speed flow control and L/S Easy-Load pump head were used together with Tygon lab tubing L/S 13 or L/S 14 (Cole-Parmer, Vernon Hills, Ill.) to control the microparticle flow through the trapping chamber. A bubble trap (Stovall Life Science, Greensbord, N.C.), was also used in conjunction with the trapping chamber to eliminate any erratic movement in the microparticles flow (FIG. 12).

Microparticles and Cells. Silica and polymethylmethacrylate (PMMA) microspheres, 3.1 or 4.5 $\mu$m in diameter (Bangs Laboratories, Fishers, Ind.), were trapped by the imaging fiber based tweezer array. A microsphere stock suspension was prepared from 100$\mu$L aliquots of microspheres that were washed three times in 0.05% Tween 20 (Sigma, St. Louis, Mo.). For the trapping experiments, the microsphere stock suspension was diluted 1:100 in 0.05% Tween 20 solution.

For the yeast cells trapping experiments, *Saccharomyces cerevisiae* strains xy222–1A (ATCC 26675) cells were used. The yeast cells were grown in YPD medium (Difco) supplemented with glucose (2%) and were shaken for 24 hours at 30° C. Before the trapping experiments, the cells were diluted 1:1000 in YPD glucose medium.

For the trapping experiments with bacteria cells, *Escherichia coli* strain 25404 (ATCC) was used. The cells were grown in Luria-Bertani (LB) medium for 12 hours at 37° C. Before the trapping experiment, the cells were diluted 1:1000 in LB medium.

Trapping experiment procedures. The trapping chamber was connected to all the flow system components and was then mounted on an inverted microscope stage. After a stable flow of microparticles through the flow cell was observed, the imaging fiber bundle was lowered into its position inside the chamber using a micropositioner, placed 25 um above the chamber bottom. The laser was turned on and focused onto the imaging fiber bundle. Once focused, the power was gradually increased until microparticle flow across the fiber face stopped, trapping the microparticles. The trapped particles were released when the laser no longer illuminated the fiber. Microparticles were trapped at different laser power outputs as shown in Table 1.

TABLE 1

Laser powers used for trapping microparticles

| Bead Type | Diameter (um) | Fiber Type | Power (per pixel) |
|---|---|---|---|
| Silica | 5 microns | Etched, no beads | 12 mW |
| Silica, PMMA | 5 microns, 3 microns | Flat polish | 15 mW |
| PMMA | 3 microns | Etched, no beads | 4 mW |
| PMMA | 3 microns | Shallower etch, no beads | 12 mW |
| PMMA | 3 microns | Etched, no beads | 12 mW |
| PMMA | 3 microns | Etched, no beads | 12.5 mW |
| PMMA | 1 micron | Etched, beads | 15.6 mW |

The optical tweezer array method and technique offers many distinct advantages over the prior art devices. The imaging fiber bundle is easily fabricated and obtained from commercial resources, yielding a cost effective, high density, precisely formed component. The method also has a minimal number of optical components, resulting in a simple setup, low cost, and ease in maintaining the system. All the optical components of the tweezer array, high power $TEM_{00}$ mode laser, micromirror array device, and inverted microscope, are common optical devices easily obtainable from commercial sources. Thus, this invention provides a simple, straightforward technique and method to sort and screen a multitude of microparticles.

What is claimed is:

1. A device for parallel trapping of multiple dielectric particles, comprising:

an optical array comprising a plurality of strands disposed coaxially along their lengths to form a single, discrete construction, wherein said array parcels a beam of light into individual beams of light, wherein the distal terminus of each strand is light focusing and wherein each strand is connectable to a detector.

2. The device according to claim 1, wherein said optical array comprises a plurality of optical fibers.

3. The device according to claim 1, wherein said optical array comprises a plurality of optical conduits.

4. The device according to claim 2, wherein said optical fibers are self-focusing.

5. The device according to claim 2, wherein said optical fibers comprise a light focusing element.

6. The device according to claim 5, wherein said light focusing element comprises a lens selected from the group consisting of polymeric coating, ball lens, cylindrical fiber lens, aspherical fiber lens, and photothermally generated lens array.

7. The device according to claim 1, further comprising a light controlling device.

8. The device according to claim 7, wherein said light controlling device comprises a digital micromirror device comprising an array of electrostatically actuated tiltable micromirrors, wherein a beam of light is reflected by said micromirrors individually into said strands, and wherein said micromirrors can further be tilted to reflect said beam of light away from said optical array.

9. The device according to claim 1, further comprising:

a fluidics system.

10. The device according to claim 9, wherein said fluidics system comprises a fluidic channel for recirculation of a sample comprising said multiple dielectric particles.

11. The device according to claim 10, wherein said fluidics system further comprises one or both of a supply vessel and a collection vessel.

12. The device according to claim 9, further comprising a pumping means.

13. A device according to claim 9, wherein said device is enclosed within a sealed container.

14. The device according to claim 1, further comprising a light detector operably coupled to said proximal or distal terminus of each said strand.

15. The device according to claim 14, wherein said light detector is selected from the group consisting of photomultipliers, diode arrays and charge coupled devices.

16. The device according to claim 15, further comprising a light source operably coupled to said multi-channel device.

17. The device according to claim 16, further comprising a data processing element operably connected to said light detector and to said multi-channel device.

18. A method for analysis of the optical properties of a population of dielectric particles, the method comprising:

dispersing a population of said dielectric particles on a device according to claim 1;

optically trapping said particles;

illuminating said particles;

detecting emitted light from individual particles;

wherein said emitted light is indicative of the optical properties of said individual particles.

19. The method according to claim 18, wherein said light controlling device comprises a digital micromirror device comprising an array of electrostatically actuated tiltable micromirrors, wherein a beam of light is reflected by said micromirrors individually into said strands, and wherein said micromirrors can further be tilted to reflect said beam of light away from said optical array.

20. The method according to claim 18, wherein said population of dielectric particles comprises cells or cellular particles.

21. The method according to claim 20, wherein said cell population is a complex population comprising two or more phenotypically distinct cells.

22. The method according to claim 18, wherein said dielectric particles comprise agents for screening.

23. The method according to claim 18, wherein said dielectric particles comprise one of a pair of binding members.

24. The method according to claim 23, wherein said dielectric particles comprise a receptor.

25. The method according to claim 24, further comprising the step of contacting said dielectric particles with mobile phase ligand and detecting the presence of interaction between a receptor and ligand.

26. The method according to claim 18, wherein said dielectric particles comprise a ligand.

27. The method according to claim 26, further comprising the step of contacting said dielectric particles with mobile phase receptor and detecting the presence of interaction between a receptor and ligand.

28. The method of claim 18, wherein said optical properties comprise the presence of fluorescent labels.

29. The method of claim 28, wherein said fluorescent labels are bound to antibodies specific for cell surface molecules.

30. The method according to claim 18, further comprising the step of selectively releasing a subset of said particle population, wherein said selectivity is determined by the presence of optical properties on said particles, and wherein said releasing step comprises turning off a trapping light beam.

31. The method of claim 30, further comprising the step of:

collecting said subset after said releasing step.

* * * * *